US005350076A

United States Patent [19]

Kalan

[11] Patent Number: 5,350,076

[45] Date of Patent: Sep. 27, 1994

[54] BRIDGE CRANE ELECTRIC MOTOR CONTROL SYSTEM

[75] Inventor: Brian A. Kalan, Lynwood, Ill.

[73] Assignee: Whiting Corporation, Harvey, Ill.

[21] Appl. No.: 851,631

[22] Filed: Mar. 16, 1992

Related U.S. Application Data

[62] Division of Ser. No. 471,309, Jan. 29, 1990, Pat. No. 5,133,465.

[51] Int. Cl.[5] .......... B66C 17/00; B60P 1/02; G06F 7/70

[52] U.S. Cl. .......... 212/209; 414/496; 414/786; 364/424.04

[58] Field of Search .......... 212/149–155, 212/159, 205, 209, 210, 214, 216, 217, 270; 414/496, 786; 364/183–184, 551.01, 424.04; 340/434, 685; 901/16

[56] References Cited

U.S. PATENT DOCUMENTS

| | | | |
|---|---|---|---|
| 2,529,804 | 11/1950 | Harnischfeger et al. | 212/208 |
| 3,204,577 | 9/1965 | Smith . | |
| 3,494,488 | 2/1970 | Morey . | |
| 3,675,786 | 7/1972 | Wilson . | |
| 4,035,621 | 7/1977 | Kemp | 364/424.04 |
| 4,041,470 | 8/1977 | Slane et al. | 364/424.04 |
| 4,093,939 | 6/1978 | Mitchell | 364/424.04 |
| 4,553,675 | 11/1985 | Kirk . | |
| 4,566,599 | 1/1986 | Villa et al. . | |
| 4,636,962 | 1/1987 | Broyden et al. | 212/149 |
| 4,641,757 | 2/1987 | Rosendale . | |
| 4,664,873 | 5/1987 | Hendrich et al. . | |
| 4,727,996 | 3/1988 | Fenn et al. . | |
| 4,750,132 | 6/1988 | Pessina et al. . | |
| 4,809,857 | 3/1989 | Steuck et al. . | |
| 4,831,539 | 5/1989 | Hagenbuch | 364/424.04 |

FOREIGN PATENT DOCUMENTS

| | | | |
|---|---|---|---|
| 694857 | 9/1965 | Italy | 212/216 |

OTHER PUBLICATIONS

Whiting Crane Handbook, Whiting Corporation, Harvey, Ill., Wm. M. Weaver (4th 1979).

Harris Publication, Probe Data Analysis System; Jun. 1982.

McGraw–Hill Encyclopedia of Science and Technology, vol. 8, McGraw–Hill, Inc., N.Y., 1987, pp. 356–358 and 480–483.

Mitsubishi Electric Corporation, Mitsubishi Programmable Controller Instruction Manual for Enhanced $F_2$ Series JY992D02801D (ROD) date: unknown.

Publication 1745–1.0, The SLC Family of Programmable Controllers, Allen–Bradley, Feb., 1986.

EMI Osborn advertisement "Replacement P.C. Control Panel" from Feb. 1989 issue of Magazine published in Jan. 1989.

Whiting Bulletin No. U–98 R3 1986 and especially the page headed "Electrical Controls" published in 1986.

*Primary Examiner*—Michael S. Huppert
*Assistant Examiner*—R. B. Johnson
*Attorney, Agent, or Firm*—Richard G. Kinney

[57] ABSTRACT

An improved bridge crane electric motor control system is disclosed, wherein a computer, a programmable controller, is employed to not only control the application of electrical energy to the motors of a bridge crane but also to count and store the instances of overload and of use. The controller is operated in accordance with a computer program which is disclosed and information relating to use is accessible by maintenance workers who may read out the amount of use and abuse of the crane and its motors and take corrective steps. The system provides greater security against unauthorized modification in the field by the operators and employs fewer and more reliable parts than previous such systems.

1 Claim, 16 Drawing Sheets

BRIDGE CRANE ELECTRIC MOTOR CONTROL SYSTEM

This is a division, of application Ser. No. 07/471,309, filed Jan. 29, 1990, now U.S. Pat. No. 5,133,465 issued Jul. 28, 1992.

FIELD OF THE INVENTION

The present invention is directed to an improved control system for large-sized electric motors used to position the active components of an overhead travelling crane.

BACKGROUND OF THE INVENTION

Overhead travelling cranes and especially bridge cranes of the type powered by electric motors conventionally have a pair of separated parallel horizontal rails with a horizontal overhead beam or bridge member or structure spanning between the separated rails. The bridge is moved horizontally along the rails by one or two electric motors which are controlled together so as to position the beam or bridge at any desired position over its range of travel. A trolley or carriage is mounted to the bridge so as to be moved horizontally along the length of the bridge by a second wound rotor electric motor. A third wound rotor electric motor serves to drive vertically a hook or other hoist assembly which is suspended beneath the trolley. By controlling the three electric motors, the hoist assembly can be placed at any desired position within a three-dimensional volume of space, an article picked up and moved to any other position in the volume.

A brief description of overhead cranes is given at pages 482–483 of Volume 8 of the McGraw-Hill Encyclopedia of Science and Technology (McGraw-Hill Inc., New York, N.Y., 1987). A fuller explanation is to be found in the text Whiting Crane Handbook, by Wm. M. Weaver (4th 1979), published by Whiting Corporation, Harvey, Ill. (the assignee of the present invention).

For electric motor-driven large overhead and bridge cranes, it has been conventional to control the electric motors by means of a manual control. With these such controls, an operator can control the movement of the crane so as to place the hoist at any location within the volume covered by the crane.

The nature of the loads carried and massive components of the crane itself coupled with the inherent characteristics of large size electric motors place restrictions on the manner and timing of the applications of electric power to the crane drive motors in response to the movement of the controls. Thus, in response to a command signal to, e.g., move the beam or bridge from a stopped position at one end of the rails toward another end of the rails, it is conventional to employ a wound rotor electric motor with resistance connected and disconnected out of the motor windings in steps so as to allow the motor to both apply large starting torque to the load and to increase speed without drawing excessive current or risking a danger of "burning out." This has in the past been accomplished by a set of mechanical timers and relays. Thus, when the operator wants to drive the bridge in one direction, the control system responds by coupling voltage through a bank of resistors in series with the motor windings. As time passes and current builds up in the motor windings, relays are activated to shunt out more and more of the series resistance until ultimately the full voltage is applied across the windings of the now up-to-speed rotor. Slowing down and stopping is achieved by the reverse process, with the addition in some circumstances of alternative mechanical brakes applied to the motor.

This prior art arrangement, while generally working well, has several drawbacks or disadvantages. Often, and especially when transporting massive loads, the load and the motor may be subjected to acceleration or deceleration (called "jogging") which can in an extreme case cause harm to the load and system. And, although the system provides a measure of protection against motor burnout, it still requires a skilled operator to prevent excessive wear and tear on the machinery and motors. A "cowboy" operator who slaps the control to full on and then full stop or reverse can still strain the system. Further, such an abusive operator can cause the consumption of excessive electrical energy as well as create greater wear and tear. And with such prior art systems, it is often difficult or impossible, short of failure, to determine the amount of wear and tear on the system. This has lead to a practice of replacing components too early in many cases so as to err on the side of safety, but at increase in the cost of maintenance.

Also, prior control systems have suffered from breakdowns resulting from wear and tear on contactors and corrosion of contact points and breakdown of mechanical timer parts.

Further, a major problem with prior such systems has been the occasional modification of the control parameters by a user's employees. Occasionally, with the best of intentions, an operating engineer will try to "improve" or speed up operation of a bridge hoist or like equipment, for example, by shortening the mechanical timer time-out periods. The result is, often, to overstress the system, create excessive wear, and, occasionally, even result in dangerous system failure.

Thus, there is a need for a control system which decreases the likelihood of "jogging," decreases wear and tear on components, and allows for better monitoring of usage and thus of wear and the need for repair and replacement of components, as well as a means for preventing uninformed changing of operating parameters, and for the monitoring and detecting of abusive operation of the controls.

SUMMARY OF THE INVENTION

To overcome one or more of the drawbacks of prior art control systems, a control system constructed in accord with the present invention for controlling an overhead crane electric motor comprises, in combination with the motor, relay switch means for controlling the application of electrical energy to the motor, and a programmable controller coupled to energize the relay switch means in response to a program and command signals. The programmable controller includes means for coupling power to the relay switch means and means for receiving said command signals as inputs, and further includes means for storing information and for outputting said information on command, and which programmable controller is programmed so as to generate and store information relative to the use of said crane over a period of time and for outputting such information on command.

A second feature of the invention is the method of controlling a crane comprising the steps of sensing and developing signals indicative of overload situations, recording the overload signals as they occur over time in a programmable controller such that the number of overload situations over time can be accumulated and determined by accessing said recorded information in said programmable controller, and then reading out the accumulated information as to usage so stored.

DETAILED DESCRIPTION OF A PREFERRED EMBODIMENT

Figure 1:
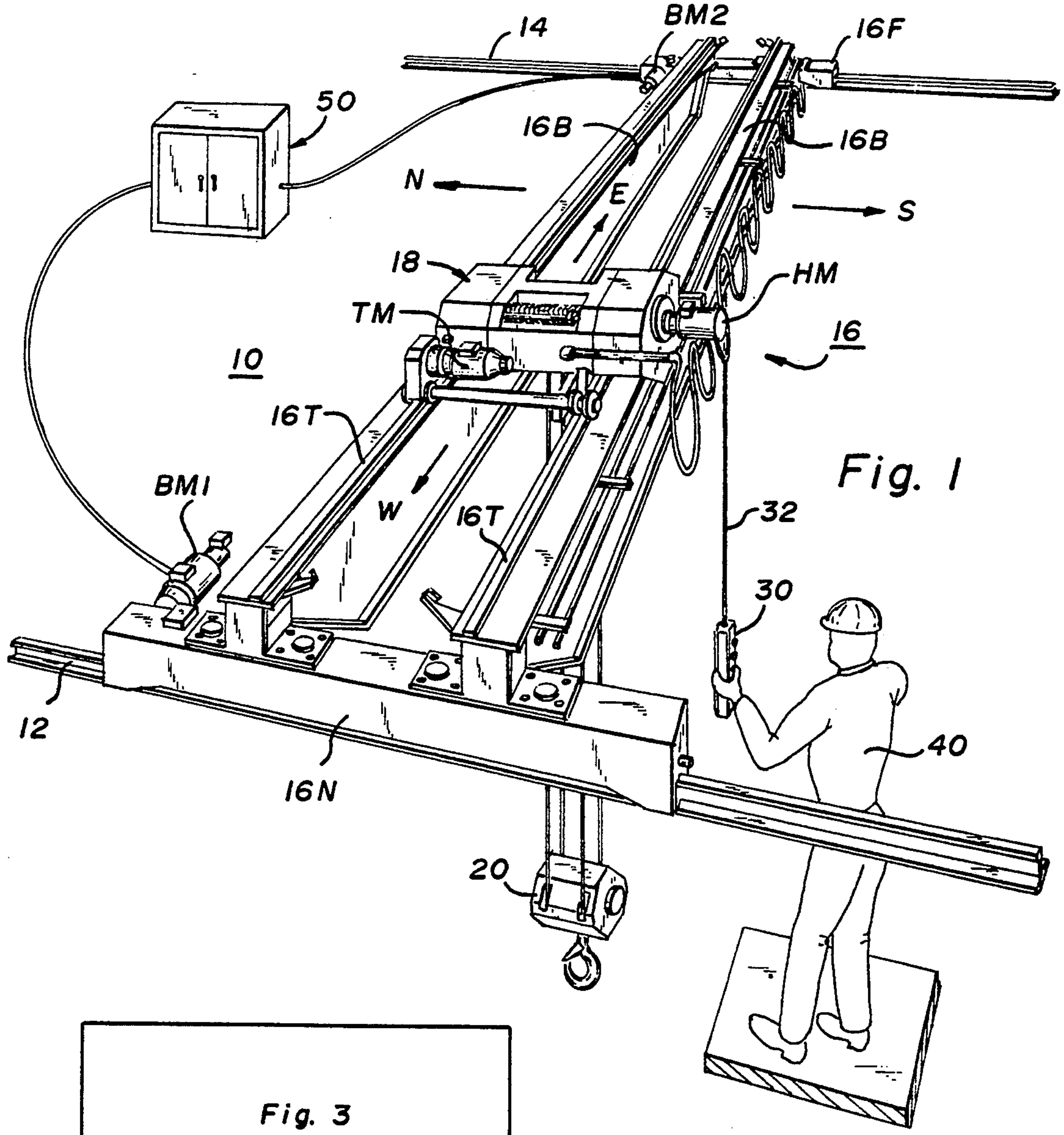
FIG. 1 is a perspective view of an example of an overhead crane which employs the control system of the present invention.

Referring now to the figures and especially to FIG. 1, there is depicted an overhead crane 10 of the bridge type. The crane 10 is mounted to a pair of parallel rails or tracks 12, 14 which are in turn mounted atop I-beams or other weight-bearing structural elements which are firmly and permanently secured along and above either side of the working area. Often, the tracks 12, 14 are secured to the elevated framework of a factory building so that the loads carried by the crane are transferred to the foundation of the building or other structure in which it is used.

The bridge crane 10 includes a bridge 16 which is mounted by wheels on the rails 12 and 14 so as to move horizontally along the rails in a direction here taken as "north and south" (N and S) for convenience. (Of course, the actual structure can be aligned with any point on the compass.) The bridge 16 is driven on the rails by a pair of wound rotor electric motors BM1 and BM2, one of which is mounted at the near end member 16N and the other at the far end member 16F of the bridge 16. Spanning between the members 16N and 16F are a pair of I-beam members 16B which support parallel tracks 16T. The bridge tracks 16T support a moveable carriage or trolley 18 which is moved by a wound rotor electric motor TM. The trolley 18 moves horizontally and perpendicular to the N-S direction of movement of the bridge 16 and thus is here taken as east-west (E-W). Also mounted on the trolley 18 is a hoist winch for driving a hoist mechanism 20 up and down. This winch and thus the hoist 20 are driven by a wound rotor electric motor HM.

The hoist 20, of course, moves up and down. Therefore, by controlling the motors BM1 and BM2, the position of the hoist 20, north and south, is controlled. By controlling the trolley motor TM, the position east and west of the hoist 20 is controlled. And, by operating the hoist motor HM, the vertical position of the hoist 20 is determined. (This is, of course, analogous to the familiar X, Y, Z right angle axes coordinate system for describing the position of any point in a three-dimensional volume.)

The motors BM, TM, and HM are controlled by a "pendant" manual control unit 30 which may for convenience hang from a flexible cable 32 from the bridge 16 so that an operator 40 may manipulate its manual controls. (The operator and pendant may be located in a cage suspended from the bridge as is shown, for example, in the aforementioned hoisting machine article in Vol. 8 of the McGraw-Hill Encyclopedia.) The motors, manual controls, and other inputs are coupled to a control unit 50 which serves to operate the bridge in response to the pendant control unit 30, in accordance with the present invention. And, although described herein for particularity in association with a push-button pendant control unit, other types of control units may be employed.

Figure 2:
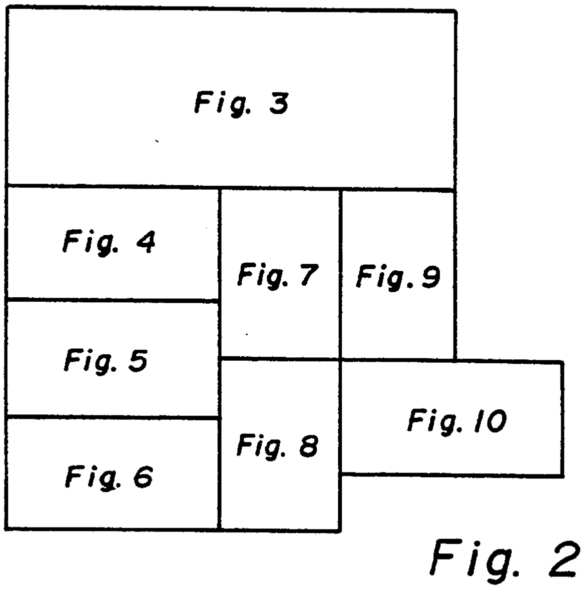
FIG. 2 is a diagrammatic representation of the interconnection of the circuit diagram of FIG. 3 through FIG. 10 which illustrates the circuit of the system employed in FIG. 1.
Figure 3:
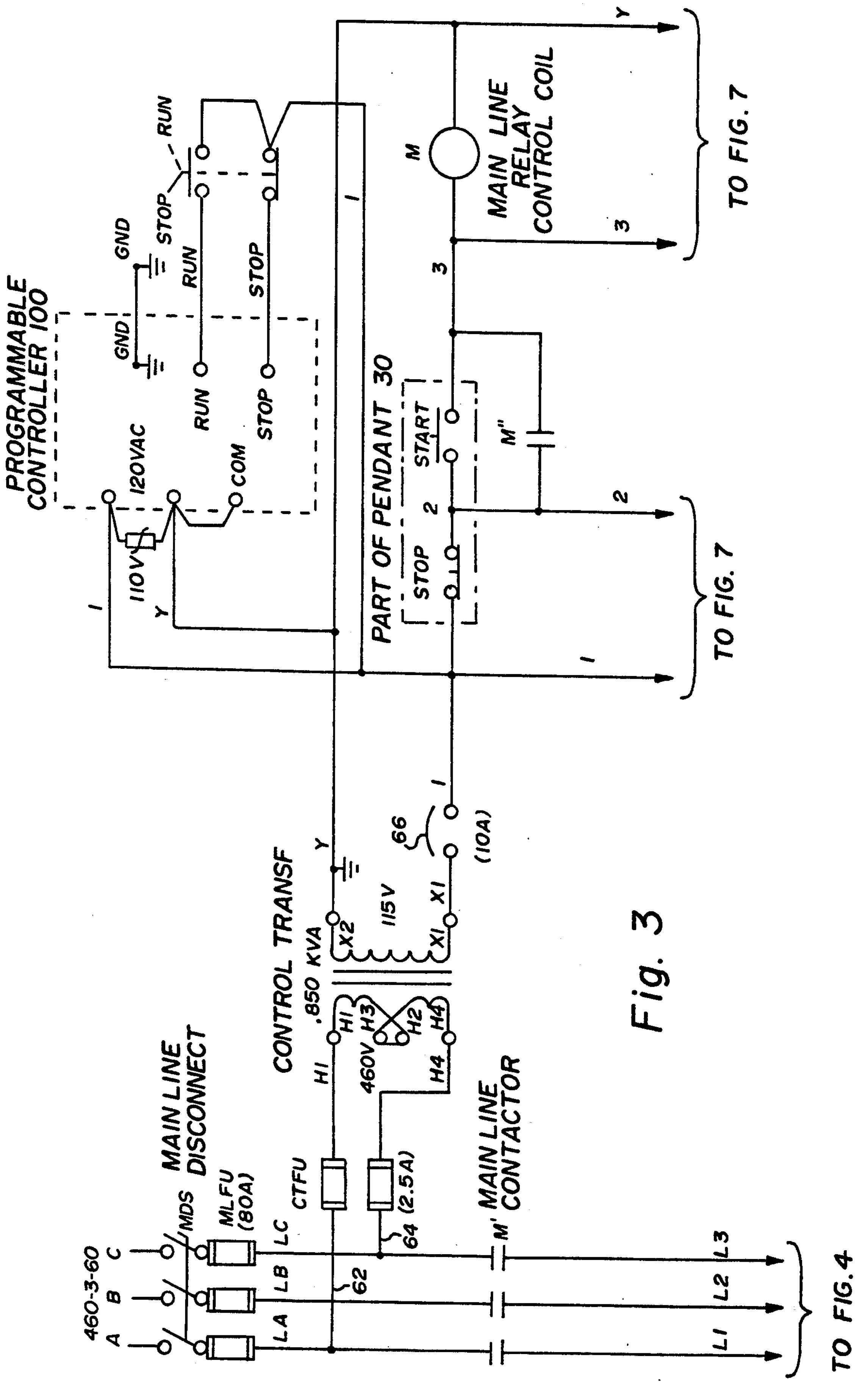
FIGS. 3 to 10 are each a circuit drawing of a portion of the circuit diagram of the system of the present invention.

FIGS. 3 to 10 describe the circuit and system constructed in accordance with the present invention. (FIG. 2 shows visually the interconnection of the circuit diagrams of FIGS. 3–10.) Referring initially to FIG. 3, three-phase alternating electric power input to the bridge is shown as mains A, B, and C which are connected through a main disconnect, ganged switches MDS and individual primary fuses LA, LB, and LC. This power source in one specific embodiment was a nominal 460 volt, three-phase, 60 cycle alternating current, with the fuses LA, LB, and LC rated at 80 amperes. Of course, one of the advantages of the present invention may be employed in many different power configurations.

As further shown in FIG. 3, one phase of the three-phase power input is tapped off by lines 62, 64 and fed through fuses CTFU to one side (H1–H4) of a stepdown transformer TRANSF. The input (X1–X2) of the transformer is at a nominal 115/120 volts ac, single phase. One side (X2) of the output is grounded and the grounded line is designated as Y. The other side (X1) of the transformer output is fed through an overcurrent protection device 66 and fed as line 1 to a number of components. One of these components is a Programmable Controller 100 whose interconnection and programming will be discussed in detail below, especially in association with FIGS. 5 to 10. The Programmable Controller 100 has internal memory and may be a Mitsubishi F2 Series unit or equivalent. The Programmable Controller 100 is connected to the lines 1 and Y to its normal 120 vac input (with a 110 V breakdown diode device secured in parallel for voltage spike control). A manual stop run switch is secured to its stop run control and to the power line 1 as shown.

The power lines 1 and Y are connected across the series connection of a manual stop-start pair of push-button switches which are part of the pendant 30. The first push-button, labelled STOP, is normally closed, and the second push-button, labelled START, is normally open. Depression of the push-button START thus connects line 1 (115 v) to line 3 and across a relay control coil M. Thus, with the main line disconnect switch MDS closed (and with the overcurrent devices open circuited), depression of the START push-button switch on the pendant 30 energizes the coil M. This coil closes the main line contactors M′ shown at the left of FIG. 3 and also closes contactors M″ to latch "on" the energizing of the coil M. Pushing the STOP push-button of pendant 30 interrupts the flow of current through M″ to the coil M, causing the contactors M″ to open as well as opening the main line contactors M′.

Figure 4:
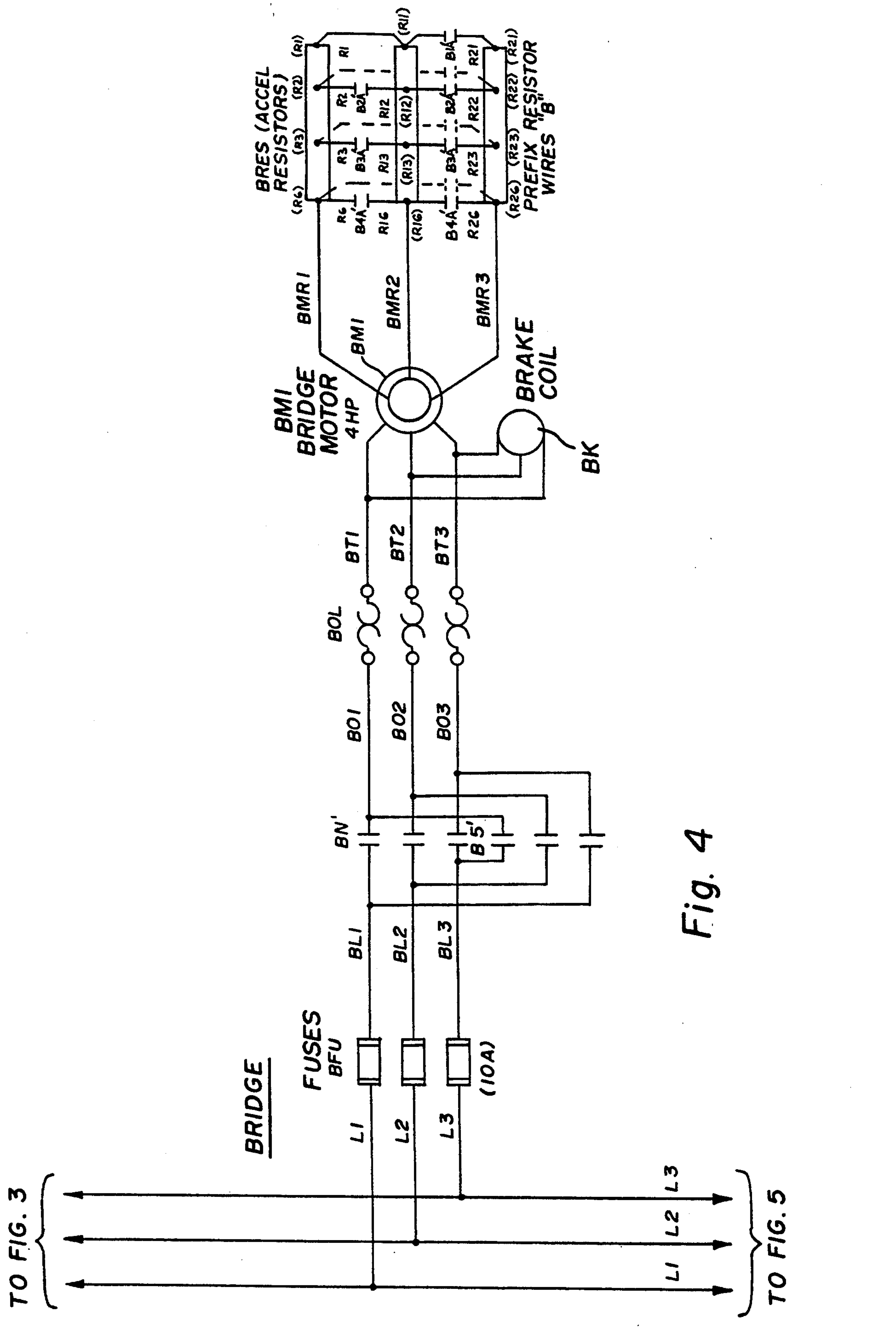
Figure 5:
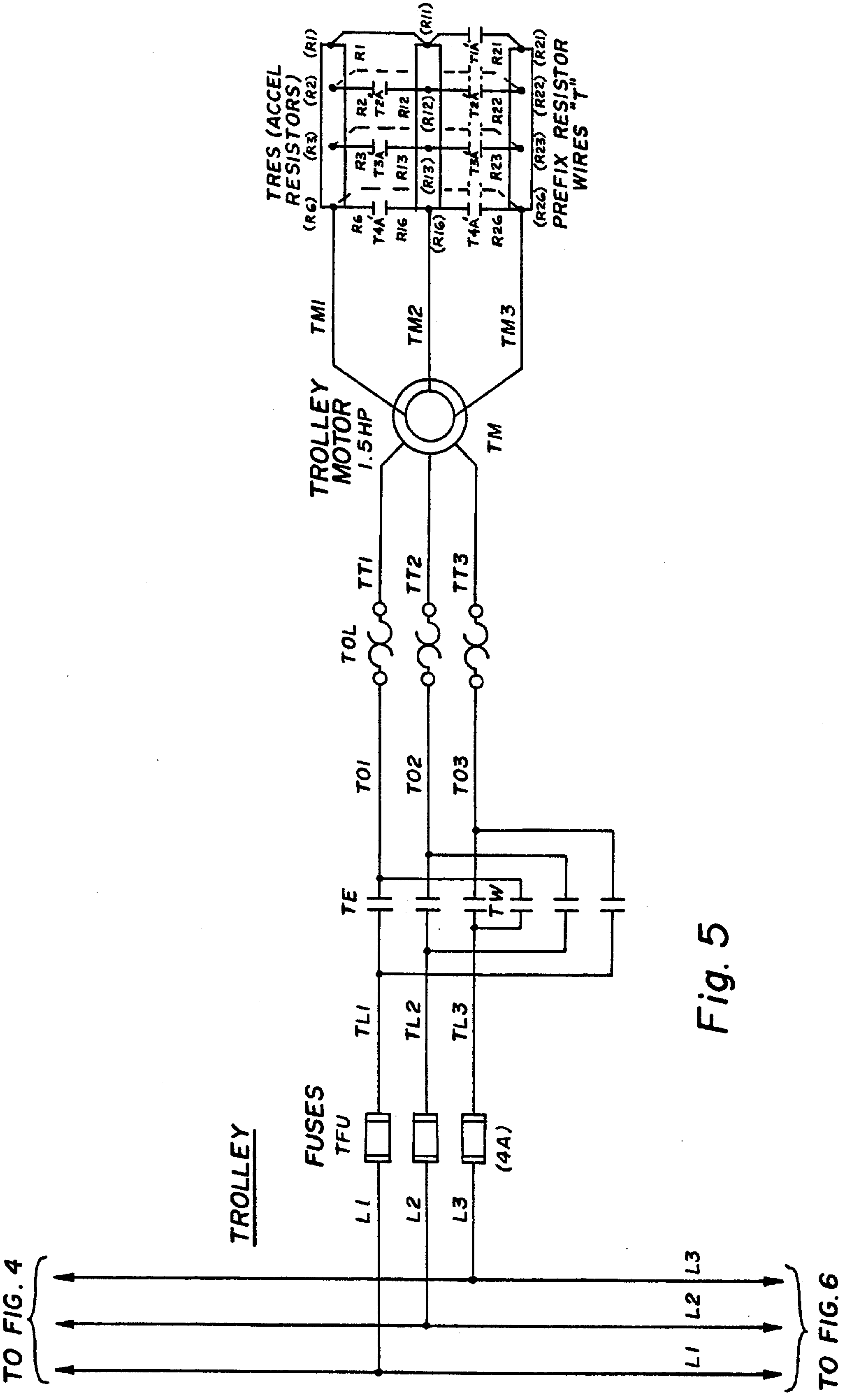
Figure 6:
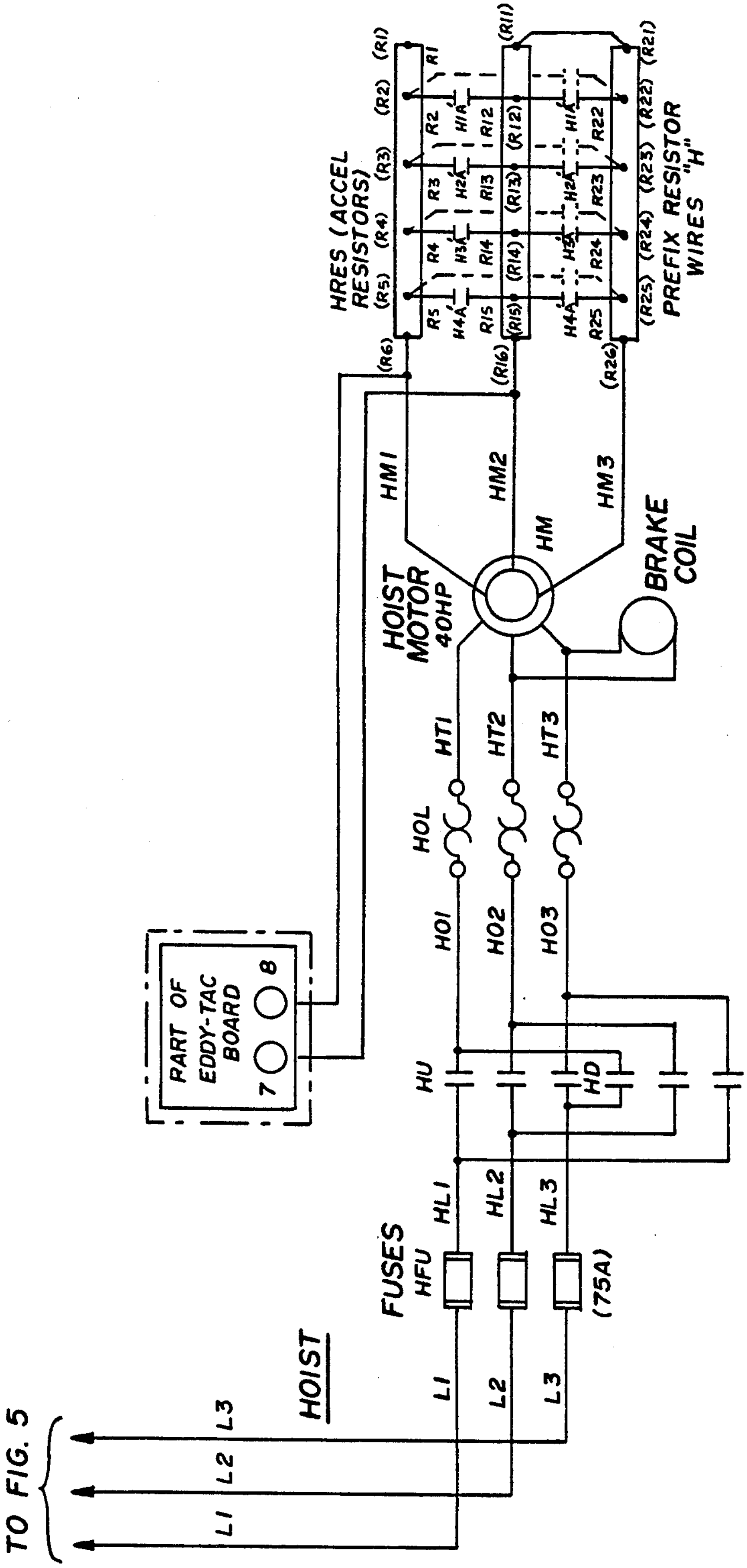

Closure of the main line contactor M′ connects the high voltage three-phase power from lines A, B, and C to the lines L1, L2, and L3 of FIGS. 4, 5, and 6. Referring first to FIG. 4, there is depicted the circuit diagram for control of the bridge motor. In the case of our example of motors BM1 and BM2, to simplify the explanation, only BM1 is shown in FIG. 4, it being understood that BM2 is connected in the same manner as BM1.

As can be seen from FIG. 4, the lines L1, L2, and L3 are individually fed through fuses BFU to lines BL1, BL2, and BL3. These lines are each connected in series to one of three contactors of a contactor set BN' and thence to one of three lines BO1, BO2, and BO3 when the contactor BN' is closed.

A second set of contactors BS' is provided whereby lines BL1, BL2, and BL3 are connected to BO3, BO2, and BO1 respectively when the contactor set BS' is closed. (Neither set of contactors BN' or BS' is ever closed at the same time, as will be explained below.)

The lines BO1–BO3 are fed through overload circuit breakers BOL to lines BT1–BT3 which are connected to the stator coils of the bridge motor BM1.

As noted before, the motor BM1 is a wound rotor motor and the rotor windings are coupled through slip rings to lines BMR1, BMR2, and BMR3 and from those lines to external resistances for starting and control. These resistances are depicted by the rectangular blocks in FIG. 4 and have a number of contactor switches tapped between them. These contactors are labelled B1A' (one contact), B2A' (two sets of contacts), B3A' (two) and B4A' (two). (Contactors bearing the same indicia are controlled in common.) Note that, with all contacts B1A' through B4A' open, a large resistance is impressed across the coils of the rotor. With contactor B4A' closed, the resistances are effectively shunted out of the rotor winding. By closing the contactors B1A' through B4A' in steps, the torque of the motor BM1 can be decreased and its efficiency increased as its speed increases and the bridge starts moving.

A brake (not shown) is provided for slowing and stopping the motor BM1 in response to the disconnection of power to the lines BT1–BT3. (All of the major motors of the crane are in direct drive connection to the mechanical components they control, so that slowing of the motors brakes the mechanical components.)

Referring to FIG. 5, the trolley motor TM control circuit is there depicted. This is essentially similar to that of the bridge motor BM1. That is, three-phase, high-voltage power is fed from lines L1–L3 through fuses TFU to lines TL1–TL3 and thus through one of two sets of contactors TE or TW to lines TO1–TO3, overload circuit breakers TOL, lines TT1–TT3 to the stator mounting of motor TM. The rotor windings of motor TM are fed through lines TM1–TM3 to prefixed resistors "T." These resistors are wired as before with a set of four banks of contactors T1A' through T4A' whose operation in sequence serves to shunt out more and more of the resistance of "T" to the rotor windings of motor TM.

Since the trolley motor TM is usually a relatively low power motor (e.g. 1.5 HP) no braking is usually required as is the case for the larger sized motors BM1 or BM2 of FIG. 4.

FIG. 6 shows the circuit connection for the hoist motor HM. As can be seen, this is similar to the circuitry for the previous two motors with three phase power applied from lines L1–L3 through fuses HFU through one or the other of two sets of contactors HU and HD to lines HO1–HO3, overload breakers HOL to lines HT1–HT3 to the stator of the hoist motor HM. Because of the high rating of hoist motors, this motor has the brake coil provision similar to that of the bridge motor BM1.

The rotor windings of the motor HM are connected to a resistance network "H" formed of three resistances bridged by contactor sets H1A' through H4A'. In this case some resistance is always kept in series with the rotor coils (note the connection of H4A') but by sequentially closing contactors H1A' through H4A' the effective resistance in series with the rotor coils is decreased.

Another difference between the circuit of FIG. 6 and that of FIGS. 4 or 5 is that lines 7 and 8 are connected across one of the rotor coils and connected to an Eddy-TAC Board or control.

This board controls an eddy current brake for the motor H7. Eddy current brakes control systems are generally described at pages 172–175 of the aforementioned Whiting Crane Handbook and this brake may be the conventional and well-known brake system. As such, it need not be here described in detail.

Figure 7:
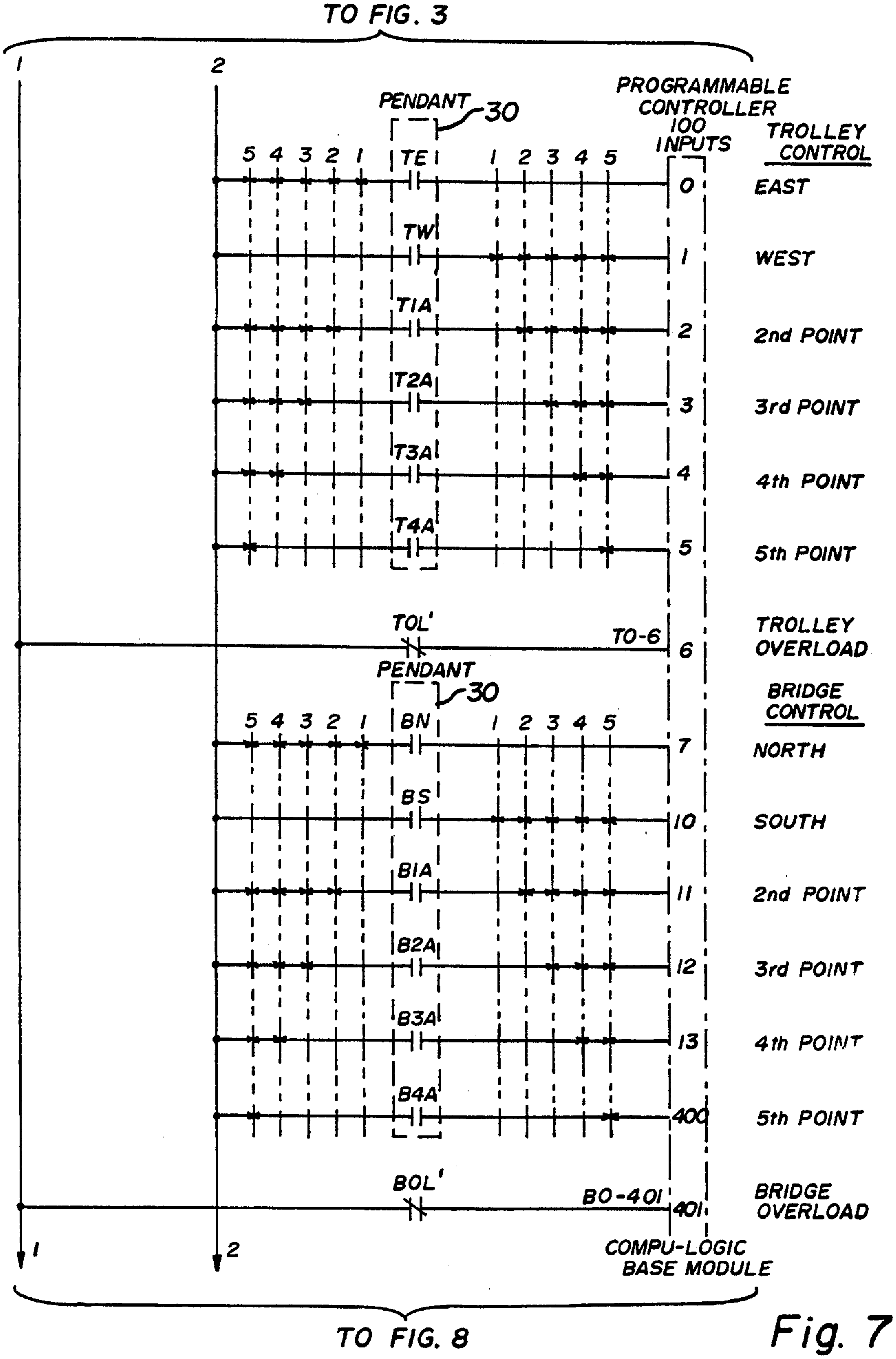

Referring now to FIGS. 7–10, the connections for the Programmable Controller 100 are shown as well as additional components of the system. In FIG. 7, the contacts of the pendant 30 are depicted as well as the inputs to the Programmable Controller 100.

Figure 8:
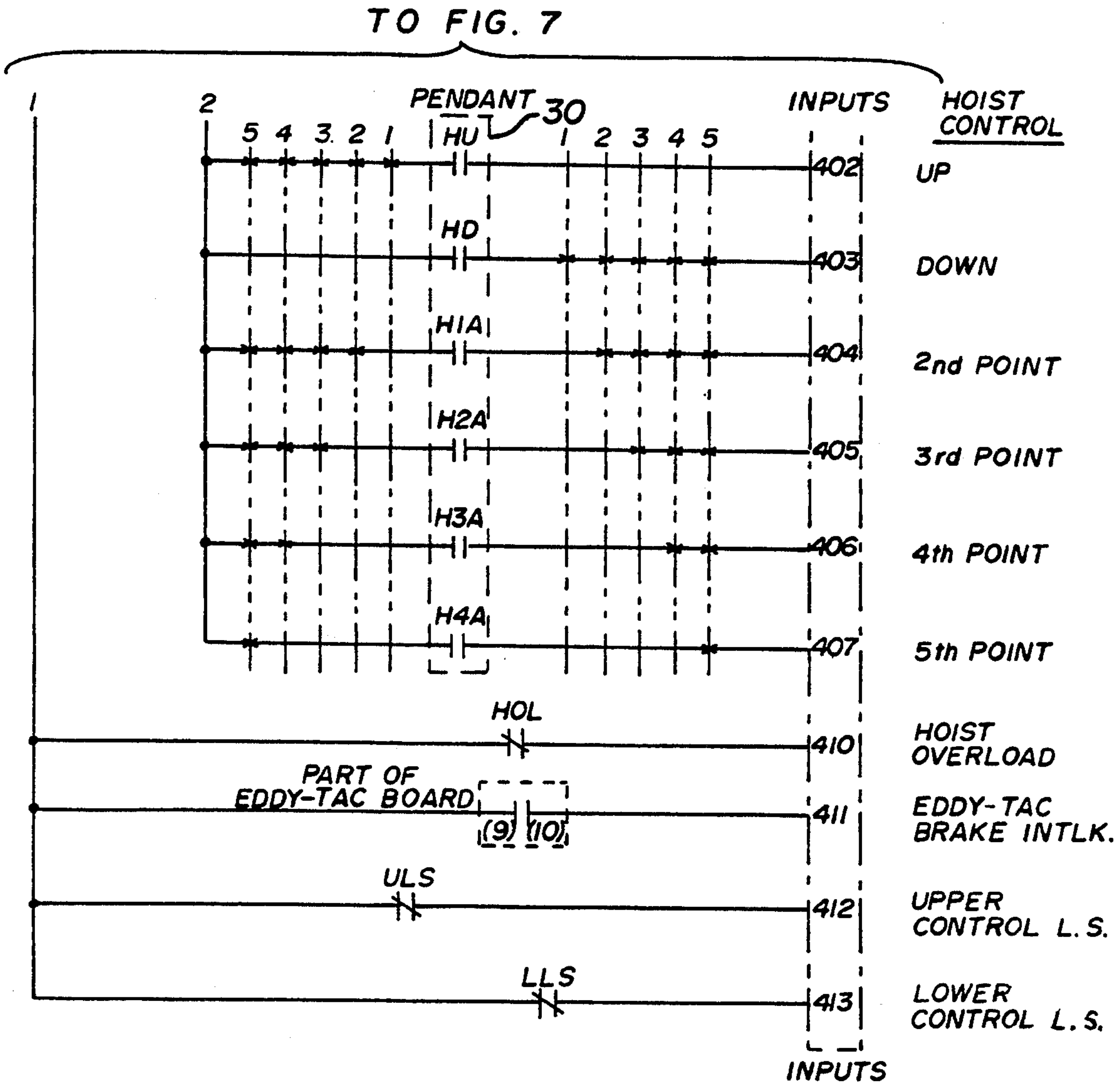

While a pendant control is depicted and described here for specificity, it should be understood that the inventive system can be employed with any conventional control unit such as master switches, radio control units (see pages 190–194 of the aforementioned Whiting Crane Handbook), or any other control unit hereafter described. The pendant unit 30 electrical contacts are depicted in FIGS. 7 and 8. In the physical pendant, the contact sets such as T1A, T2A, T3A, and T4A are coupled to a single push-button and represent different depths of depressing of the button. Depressing a button such as one for "trolley east" initially closes contactor TE (at the top of FIG. 7) and results in a signal at input "0" and pushing the button in further also closes contactor T1A which results in a signal or input "2" of the Programmable Controller 100. Further pushing inward of the TE button closes contact T2A, while maintaining contact T1A closed. The status of the contacts are indicated schematically by the crosses at the dashed lines 5, 4, 3, 2, 1 and 1, 2, 3, 4, and 5, to the left and right of the pendant 30 in FIGS. 7 and 8. Thus, from FIG. 7 it can be observed that, when the button TE is depressed to its maximum depth (line 5), contacts T4A, T3A, T2A, T1A, and TE are all closed, as indicated by the crosses on dashed line 5 to the left of the pendant 30.

Engaging the contact TE sends a signal that the trolley is directed to be run "east" (TW indicates trolley west), T1A–T4A indicate desire for more speed.)

The trolley overload signal is the opening of a relay switch contacts TOL' shown in FIG. 7. This interrupts the manual "on" (115 v from line 1) signal on input 6.

The connection and operation of the bridge control pendant controls BN', B5', B1A', B2A', B3A', B4A' of FIG. 3, which feed, respectively, inputs 7, 10, 11, 12, 13, and 400 of the Programmable Controller 100 function in a manner similar to that described above.

A BOL' normally closed relay contactor provides the input 401 of the Programmable Controller 100 in a manner similar to that of the TOL' contactor described above.

FIG. 8 completes the pendant controls and identifies the hoist up, down, and points 2 through 5 inputs as 402–407 of the Programmable Controller 100 and the hoist overload contactor HOL' input 410. In addition, FIG. 8 identifies the input for the Eddy-TAC Board interlock 411.

Also shown in FIG. 8 are the normally closed contacts ULS of the conventional upper control limit switch and the normally closed contacts LLS of the conventional lower control limit switch.

Figure 9:
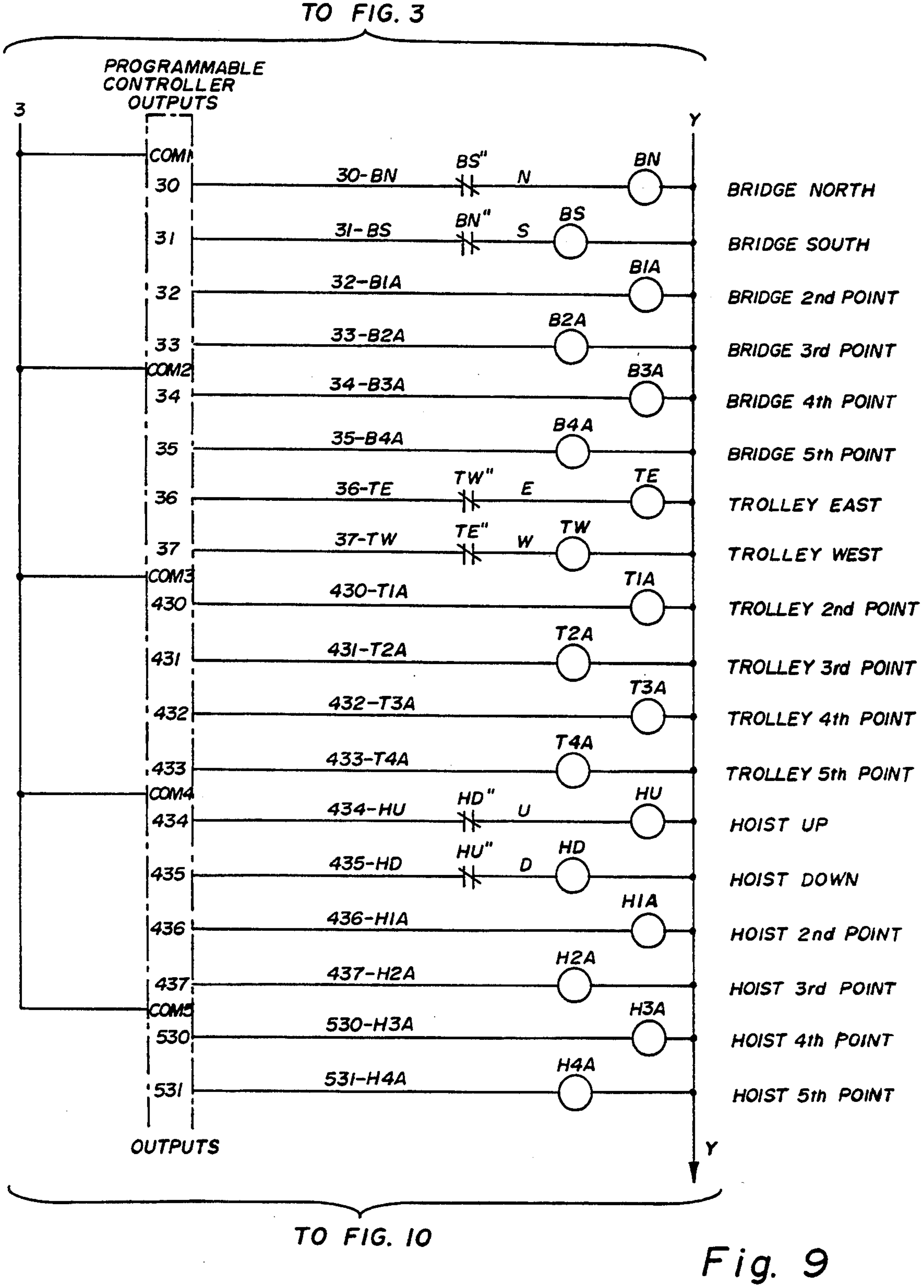
Figure 10:
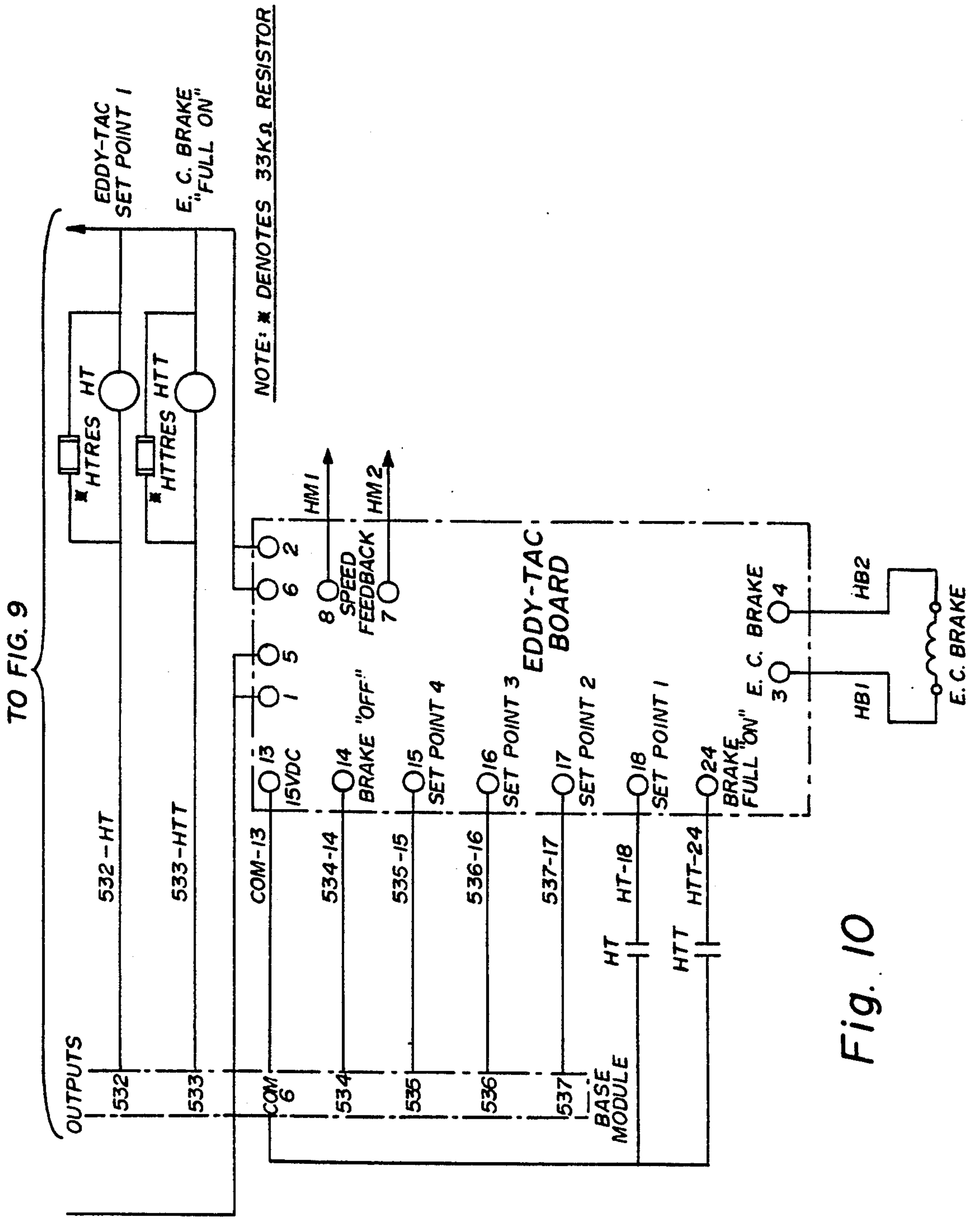

Referring now to FIGS. 9 and 10, the outputs of the Programmable Controller 100 are there shown together with the components activated or driven by these outputs.

The output 30 when active currents power from line 3 through the NC contactor BS" and to the coil BN when BS" is closed. The next output 31 is connected to a contactor BN" in series with a coil BS. When the line 30 is energized by the Programmable Controller 100 and the contactor BS" is closed, power is supplied to the coil BN which opens the contactors BN" and thus prevents power from being applied to coil BS. Similarly, when coil BS is energized it opens contactors BS' and prevents energization of coil BN. Thus, only one coil BN or BS can be energized at one time.

Now, referring back to FIG. 4, the contactors sets BN' and BS' are respectively controlled by energization of the coils BN and BS of FIG. 9. When the set BN' is closed the set BS' is open and vice versa. Also, when the set BN' is closed the three phase electric power is applied to the motor BM1 (and BM2) so as to turn those motors in one direction (e.g. clockwise) so as to drive the bridge north. Reversing the combination serves to cause the motor BM1 (and BM2) to turn in the reverse direction and drive the bridge south.

Again referring to FIG. 9, the output 32 when producing an output energizes the coil B1A of FIG. 9 which in turn closes the relay contacts B1A' of FIG. 4.

HD", HV, HD, H1A, H2A, H3A, H4A, and contactors sets H1A'–H4A' of FIG. 6.

Referring to FIG. 10, there are depicted the remaining Programmable Controller 100 outputs used in the system. These are numbers 532–537. The output 532 serves when energized to connect 115 volt a.c. power to the parallel circuit connection of coil HT and resistor HTRES.

Energization of the coil HT closes the contactor HT and couples 15 volt a.c. from the output 13 of the EDDY-TAC Board to input 18 (set part 1) of that board. Energization of the coil HTT does the same with contactor HTT and input point 24 of the EDDY-TAC Board to activate the Eddy Current brake.

OPERATION

The Programmable Controller 100 directs the operation of the system in response to the inputs detailed above and especially in response to the manual activated inputs of the pendant 30. The complete program for these operations is set out below. It will, however, be instructive to go over a couple of sequences of the novel operation of the system to aid in understanding its operation and to help understand the below set out program.

One major advantage of the present system over prior art systems is the monitoring of the operation of the crane to determine the amount of use and severity of use involved over a period. The system allows a user to determine how many movements up of, e.g., the hoist 20 have occurred since startup of the system (or from the last time the counter of such movements is reset). For a specific example, consider steps 172 and 176 of the program:

```
172 ! HUPB    HU                                HUCTR      !
    +--] [---] [----------------------------(CTR C463)---+
    !  X402   Y434                              K0          !
    !                                                       !
    !                                                       !
    !                                                       !
```

Comments: Hoist up directional counter:actuations up to one-thousand.

```
176 ! SU/SD  HUPB     HU                         HUCTR      !
    +--] [---] [---] [---] [------------------(CTR C464)---+
    !  M476   X402    Y434                      K0          !
    !                                                       !
    !                                                       !
    !                                                       !
```

Comments: Hoist up directional counter;thousands of actuations.

Output 33 of the Programmable Controller 100 drives a coil B2A which when energized closes the contacts B2A' of FIG. 4. Similarly, output 34 controls coil B3A and thus contacts B3A' of FIG. 4. The same result is obtained with output 35, coil B4A and contacts B4A' of FIG. 4. The result is that energy output on outputs 32–35 serve to shunt out progressively more rotor series resistance and thus control the torque and speed of the bridge motors BM1 of FIG. 4. (and BM2 of FIG. 1).

The next set of outputs in FIG. 9, numbers 36 to 37 and 430 to 433 (of the Programmable Controller 100) serve to block out one of coils TE or TW by controlling contactors TW" and TE" and to control the direction (East or West) of the trolley moving motor and to control its torque and speed by closing the contactors sets T1A–T4A of the rotor resistance bridge T of motor TM of FIG. 5.

The next set of outputs in FIG. 9 (namely 434–437 and 530– 531) function similarly with contactors HD", In step 172, the Programmable Controller 100 reacts to the presence of both an input 402 and an output 434 to activate (once) its internal counter 463. Input 402 as shown at FIG. 8 is the pendant 30 input resulting from the closure of the hoist up manual control PHU. Output 434 as shown at FIG. 9 is the output which energizes the coil HU (if contactors HO" are closed). Thus, both signals serve as redundant indicators of an actual hoist up condition and this results in a count being taken by the counter 463. Because counter 463 only counts up to 999 and then resets to 000, it is necessary to also count "up hoist" cycles 1000 and over. This is accomplished in step 176 wherein a second (thousands) counter is activated in response to moving output 476 and input 402 and output 434. These latter are the same redundant hoist up signals as activate counter 463. Signal 476 is an internal signal generated by a counter circuit in the Programmable Controller and is present when the first counter has counted out to 1000. Thus, the two counters allow counting and storing of up to 999,999 "up-hoist" activities.

One important feature of the present invention is the accumulation of information as to "hard use" of the crane. Such hard use or abuse can lead to early failure of the electric motors used in the system as well as wear and failure of the mechanical components. Thus, the invention system provides for detection and recording of instances of overload activities. For example, step 146:

```
146 !SCAN1    TOL                              TOCTR      !
    +--]/[---]/[---------------------------(CTR C065)---+
    !  M071   X006                               K0       !
    !                                                     !
    !                                                     !
    !                                                     !
```

This uses signal 71—an internal scan feature of the PLC, is "on" when the unit is up and running, used here to prevent possible false counts on start up—and signal from input 6 (TOL', FIG. 7) to operate internal counter 65.

The effect of this is to store and account on counter 65 instances of hoist overload so as to more accurately gauge the status of the crane over time. Excessive numbers of overloads indicate user abuse or the need to upgrade the power of the motor HM and/or the mechanical components of the hoist.

THE FULL PROGRAM

The full program, related notes, and a listing of inputs, outputs, and other components, are reproduced below:

```
Furnas Micro PC96 Model:K60 Ladder Diagram Documentation

    Title - Compu-Logic crane control program
Step
   0 !BNPB   BOL   BS                                          BN       !
     +-] [---] [---]/[---------------------------------(OUT Y030)---+
     ! X007  X401  Y031                                              !
     !                                                               !
     !                                                               !
     !                                                               !
Comments: Bridge North directional.

   4 !BSPB   BOL   BN                                          BS       !
     +-] [---] [---]/[---------------------------------(OUT Y031)---+
     ! X010  X401  Y030                                              !
     !                                                               !
     !                                                               !
     !                                                               !
Comments: Bridge South directional.

   8 !B1APB  BN                                                B1A      !
     +-] [-+-] [-+-------------------------------------(OUT Y032)---+
     ! X011! Y030!                                                   !
     !     !     !                                                   !
     !     ! BS  !                                         B1AT      !
     !     +-] [-+-------------------------------------(TMR T050)---+
     !       Y031                                          K2.0      !
     !                                                               !
     !                                                               !
Comments: Bridge 2nd point.

  15 !B1AT   B2APB  B1A                                        B2A      !
     +-] [---] [---] [-+-------------------------------(OUT Y033)---+
     ! T050  X012  Y032!                                             !
     !                 !                                             !
     !                 !                                   B2AT      !
     !                 +-------------------------------(TMR T051)---+
     !                                                     K2.0      !
     !                                                               !
     !                                                               !
```

```
Comments: Bridge 3rd point.

 21 !B2AT   B3APB  B2A                                          B3A       !
    +-] [---] [---] [-+-----------------------------------(OUT Y034)--+
    ! T051  X013  Y033!                                                !
    !                 !                                                !
    !                 !                                        B3AT    !
    !                 +-----------------------------------(TMR T052)---
    !                                                      K2.0        !
    !                                                                  !
    !                                                                  !
Comments: Bridge 4th point.

 27 !B3AT   B4APB  B3A                                          B4A       !
    +-] [---] [---] [-------------------------------------(OUT Y035)--+
    ! T052  X400  Y034                                                 !
    !                                                                  !
    !                                                                  !
    !                                                                  !
Comments: Bridge 5th point.

 31 !TEPB   TOL    TW                                           TE        !
    +-] [---] [---]/[-------------------------------------(OUT Y036)--+
    ! X000  X006  Y037                                                 !
    !                                                                  !
    !                                                                  !
    !                                                                  !
Comments: Trolley East directional.

 35 !TWPB   TOL    TE                                           TW        !
    +-] [---] [---]/[-------------------------------------(OUT Y037)--+
    ! X001  X006  Y036                                                 !
    !                                                                  !
    !                                                                  !
    !                                                                  !
Comments: Trolley West directional.

 39 !T1APB  TE                                                  T1A       !
    +-] [-+-] [-+-----------------------------------------(OUT Y430)--+
    ! X002! Y036!                                                      !
    !     !     !                                                      !
    !     ! TW  !                                              T1AT    !
    !     +-] [-+-----------------------------------------(TMR T053)--+
    !       Y037                                           K2.0        !
    !                                                                  !
    !                                                                  !
Comments: Trolley 2nd point.

 46 !T1AT   T2APB  T1A                                          T2A       !
    +-] [---] [---] [-+-----------------------------------(OUT Y431)--+
    ! T053  X003  Y430!                                                !
    !                 !                                                !
    !                 !                                        T2AT    !
    !                 +-----------------------------------(TMR T054)--+
    !                                                      K2.0        !
    !                                                                  !
    !                                                                  !
Comments: Trolley 3rd point.

 52 !T2AT   T3APB  T2A                                          T3A       !
    +-] [---] [---] [-+-----------------------------------(OUT Y432)--+
    ! T054  X004  Y431!                                                !
    !                 !                                                !
    !                 !                                        T3AT    !
    !                 +-----------------------------------(TMR T055)--+
    !                                                      K2.0        !
    !                                                                  !
    !                                                                  !
```

```
Comments: Trolley 4th point.

 58 !T3AT  T4APB  T3A                                              T4A      !
    +-] [---] [---] [--------------------------------------------(OUT Y433)--+
    ! T055  X005  Y432                                                      !
    !                                                                       !
    !                                                                       !
    !                                                                       !
Comments: Trolley 5th point.

 62 !HUPB                                                           EC1st   !
    +-] [-+--------------------------------------------------------(OUT Y532)--+
    ! X402!                                                                 !
    !     !                                                                 !
    !HDPB !                                                                 !
    +-] [-+                                                                 !
    ! X403                                                                  !
    !                                                                       !
    !                                                                       !
Comments: Eddy-current brake "1st point on" signal to Eddy-Tac.

 65 !HUPB   HOL  ECINT HULS   HD                                     HU     !
    +-] [---] [---] [---] [---]/[-------------------------------(OUT Y434)--+
    ! X402  X410  X411  X412  Y435                                          !
    !                                                                       !
    !                                                                       !
    !                                                                       !
Comments: Hoist up directional.

 71 !HDPB   HOL  ECINT HLLS   HU                                     HD     !
    +-] [---] [---] [---] [---]/[-------------------------------(OUT Y435)--+
    ! X403  X410  X411  X413  Y434                                          !
    !                                                                       !
    !                                                                       !
    !                                                                       !
Comments: Hoist down directional.
 77 !HUPB                                                           H1A     !
    +-] [-+--------------------------------------------------------(OUT Y436)--+
    ! X402!                                                                 !
    !     !                                                                 !
    !H4APB!                                                         H1AT    !
    +-] [-+--------------------------------------------------------(TMR T056)--+
    ! X407                                                          K2.0    !
    !                                                                       !
    !                                                                       !
Comments: Hoist 2nd point.

 82 !H1AT  H1APB  H1A                                               H2A     !
    +-] [---] [---] [-+--------------------------------------------(OUT Y437)--+
    ! T056  X404  Y436!                                                     !
    !                 !                                                     !
    !                 !                                             H2AT    !
    !                 +--------------------------------------------(TMR T057)--+
    !                                                               K2.0    !
    !                                                                       !
    !                                                                       !
Comments: Hoist 3rd point.

 88 !H2AT  H2APB  H2A                                               H3A     !
    +-] [---] [---] [-+--------------------------------------------(OUT Y530)--+
    ! T057  X405  Y437!                                                     !
    !                 !                                                     !
    !                 !                                             H3AT    !
    !                 +--------------------------------------------(TMR T450)--+
    !                                                               K2.0    !
    !                                                                       !
    !                                                                       !
Comments: Hoist 4th point.

 94 !H3AT  H4APB  H3A                                               H4A     !
    +-] [---] [---] [----------------------------------------------(OUT Y531)--+
    ! T450  X407  Y530                                                      !
    !                                                                       !
    !                                                                       !
    !                                                                       !
```

Comments: Hoist 5th point.

```
 98 ! H4A   HD                                             ECOFF    !
    +-] [---] [-+-----------------------------------------(OUT Y534)--+
    ! Y531  Y435!                                                    !
    !           !                                                    !
    !H3APB  HU  !                                                    !
    +-] [---] [-+                                                    !
    ! X406  Y434                                                     !
    !                                                                !
    !                                                                !
```

Comments: Hoist eddy-current brake de-energized.

```
104 !H3APB                                                 EC4th    !
    +-] [---------------------------------------------------(OUT Y535)--+
    ! X406                                                           !
    !                                                                !
    !                                                                !
    !                                                                !
```

Comments: Hoist eddy-current brake 4th point signal to eddy-tac.

```
106 !H2APB                                                 EC3rd    !
    +-] [---------------------------------------------------(OUT Y536)--+
    ! X405                                                           !
    !                                                                !
    !                                                                !
    !                                                                !
```

Comments: Hoist eddy-current 3rd point signal to eddy-tac.

```
108 !H1APB                                                 EC2nd    !
    +-] [---------------------------------------------------(OUT Y537)--+
    ! X404                                                           !
    !                                                                !
    !                                                                !
    !                                                                !
```

Comments: Hoist eddy-current brake 2nd point signal to eddy-tac.

```
110 !EC1st ECFOT                                           ETCON    !
    +-] [-+-]/[-+-----------------------------------------(OUT M100)--+
    ! Y532! T451!                                                    !
    !     !     !                                                    !
    !ETCON!     !EC1st                                     ECFOT    !
    +-] [-+     +-]/[-------------------------------------(TMR T451)--+
    ! M100        Y532                                   K4.0        !
    !                                                                !
    !                                                                !
```

Comments: Hoist eddy-current brake "full on" timer.

```
117 !ETCON EC1st                                           ECFON    !
    +-] [---]/[-------------------------------------------(OUT Y533)--+
    ! M100  Y532                                                     !
    !                                                                !
    !                                                                !
    !                                                                !
```

Comments: Hoist eddy-current brake "full on" output.

```
120 !PCRUN                                                 UP/DN    !
    +-] [---------------------------------------------------(OUT M474)--+
    ! M070                                                           !
    !                                                                !
    !                                                                !
    !                                                                !
```

Comments: Up/down counter mode selected.

```
122 !PCRUN                                                 UPMOD    !
    +-] [---------------------------------------------------(OUT M475)--+
    ! M070                                                           !
    !                                                                !
    !                                                                !
    !                                                                !
```

Comments: Up counting mode selected.

```
124 !SCAN1  BOL                                                BOCTR    !
    +-]/[---]/[---------------------------------------------(CTR C060)--+
    ! M071  X401                                             K0         !
    !                                                                   !
    !                                                                   !
    !                                                                   !
```

Comments: Bridge overload counter;actuations up to one-thousand.

```
128 !BNPB   BN                                                 BNCTR    !
    +-] [---] [---------------------------------------------(CTR C061)--+
    ! X007  Y030                                             K0         !
    !                                                                   !
    !                                                                   !
    !                                                                   !
```

Comments: Bridge North directional counter;actuations up to one-thousand

```
132 !SU/SD BNPB   BN                                           BNCTR    !
    +-] [---] [---] [---------------------------------------(CTR C062)--+
    ! M476  X007  Y030                                       K0         !
    !                                                                   !
    !                                                                   !
    !                                                                   !
```

Comments: Bridge North directional counter;thousands of actuations.

```
137 !BSPB   BS                                                 BSCTR    !
    +-] [---] [---------------------------------------------(CTR C063)--+
    ! X010  Y031                                             K0         !
    !                                                                   !
    !                                                                   !
    !                                                                   !
```

Comments: Bridge South directional counter;actuations up to one-thousand

```
141 !SU/SD BSPB   BS                                           BSCTR    !
    +-] [---] [---] [---------------------------------------(CTR C064)--+
    ! M476  X010  Y031                                       K0         !
    !                                                                   !
    !                                                                   !
    !                                                                   !
```

Comments: Bridge South directional counter:thousands of actuations.

```
146 !SCAN1  TOL                                                TOCTR    !
    +-]/[---]/[---------------------------------------------(CTR C065)--+
    ! M071  X006                                             K0         !
    !                                                                   !
    !                                                                   !
    !                                                                   !
```

Comments: Trolley overload counter;actuations up to one-thousand.

```
150 !TEPB   TE                                                 TECTR    !
    +-] [---] [---------------------------------------------(CTR C066)--+
    ! X000  Y036                                             K0         !
    !                                                                   !
    !                                                                   !
    !                                                                   !
```

Comments: Trolley East directional counter;actuations up to one-thousand

```
154 !SU/SD TEPB   TE                                           TECTR    !
    +-] [---] [---] [---------------------------------------(CTR C067)--+
    ! M476  X000  Y036                                       K0         !
    !                                                                   !
    !                                                                   !
    !                                                                   !
```

Comments: Trolley East directional counter:thousands of actuations.

```
159 !TWPB   TW                                                 TWCTR    !
    +-] [---] [---------------------------------------------(CTR C460)--+
    ! X001  Y037                                             K0         !
    !                                                                   !
    !                                                                   !
    !                                                                   !
```

Comments: Trolley West directional counter;actuations up to one-thousand

```
163 !SU/SD TWPB   TW                                           TWCTR   !
    +-] [---] [---] [-----------------------------------------(CTR C461)--+
    ! M476  X001  Y037                                         K0      !
    !                                                                  !
    !                                                                  !
    !                                                                  !
```

Comments: Trolley West directional counter:thousands of actuations.

```
168 !SCAN1  HOL                                                HOCTR   !
    +-]/[---]/[-----------------------------------------------(CTR C462)--+
    ! M071  X410                                               K0      !
    !                                                                  !
    !                                                                  !
    !                                                                  !
```

Comments: Hoist overload counter:actuations up to one-thousand.

```
172 !HUPB   HU                                                 HUCTR   !
    +-] [---] [-----------------------------------------------(CTR C463)--+
    ! X402  Y434                                               K0      !
    !                                                                  !
    !                                                                  !
    !                                                                  !
```

Comments: Hoist up directional counter:actuations up to one-thousand.

```
176 !SU/SD HUPB   HU                                           HUCTR   !
    +-] [---] [---] [-----------------------------------------(CTR C464)--+
    ! M476  X402  Y434                                         K0      !
    !                                                                  !
    !                                                                  !
    !                                                                  !
```

Comments: Hoist up directional counter;thousands of actuations.

```
Step
181 !HDPB   HD                                                 HDCTR   !
    +-] [---] [-----------------------------------------------(CTR C465)--+
    ! X403  Y435                                               K0      !
    !                                                                  !
    !                                                                  !
    !                                                                  !
```

Comments: Hoist down directional counter;actuations up to one-thousand.

```
185 !SU/SD HDPB   HD                                           HDCTR   !
    +-] [---] [---] [-----------------------------------------(CTR C466)--+
    ! M476  X403  Y435                                         K0      !
    !                                                                  !
    !                                                                  !
    !                                                                  !
```

Comments: Hoist down directional counter:thousands of actuations.

```
190 !SCAN1 HULS                                                ULCTR   !
    +-]/[---]/[-----------------------------------------------(CTR C467)--+
    ! M071  X412                                               K0      !
    !                                                                  !
    !                                                                  !
    !                                                                  !
```

Comments: Hoist upper limit switch counter;actuations up to one-thousand

```
194 !SCAN1 HLLS                                                LLCTR   !
    +-]/[---]/[-----------------------------------------------(CTR C560)--+
    ! M071  X413                                               K0      !
    !                                                                  !
    !                                                                  !
    !                                                                  !
```

Comments: Hoist lower limit switch counter;actuations up to one-thousand

Furnas Micro PC96 Model:K60 I/O Label and If Used Listing

Title - Compu-Logic crane control program

INPUT/OUTPUT REFERENCE LIST Page 1

| INPUTS | INPUTS | INPUTS | OUTPUTS |
|---|---|---|---|
| ADDR-LABEL-USED | ADDR-LABEL-USED | ADDR-LABEL-USED | ADDR-LABEL-USED |
| X000-TEPB - 3 | X010-BSPB - 3 | X020- - | Y030- BN - 5 |
| X001-TWPB - 3 | X011-B1APB- 1 | X021- - | Y031- BS - 5 |
| X002-T1APB- 1 | X012-B2APB- 1 | X022- - | Y032- B1A - 2 |
| X003-T2APB- 1 | X013-B3APB- 1 | X023- - | Y033- B2A - 2 |
| X004-T3APB- 1 | X014- - | X024- - | Y034- B3A - 2 |
| X005-T4APB- 1 | X015- - | X025- - | Y035- B4A - 1 |
| X006- TOL - 3 | X016- - | X026- - | Y036- TE - 5 |
| X007-BNPB - 3 | X017- - | X027- - | Y037- TW - 5 |

INPUT/OUTPUT REFERENCE LIST Page 2

| OUTPUTS | TIMERS | COUNTERS | SPECIAL RELAYS |
|---|---|---|---|
| ADDR-LABEL-USED | ADDR-LABEL-USED | ADDR-LABEL-USED | ADDR-LABEL-USED |
| Y040- - | T050-B1AT - 2 | C060-BOCTR- 1 | M070-PCRUN- 2 |
| Y041- - | T051-B2AT - 2 | C061-BNCTR- 1 | M071-SCAN1- 5 |
| Y042- - | T052-B3AT - 2 | C062-BNCTR- 1 | M072-.1sPL- |
| Y043- - | T053-T1AT - 2 | C063-BSCTR- 1 | M073-.01PL- |
| Y044- - | T054-T2AT - 2 | C064-BSCTR- 1 | M074-LINTR- |
| Y045- - | T055-T3AT - 2 | C065-TOCTR- 1 | M075-LFAIL- |
| Y046- - | T056-H1AT - 2 | C066-TECTR- 1 | M076-BATLO- |
| Y047- - | T057-H2AT - 2 | C067-TECTR- 1 | M077-OFF-O- |

INPUT/OUTPUT REFERENCE LIST Page 3

| AUX.RELAY / MCR | AUX.RELAY / MCR | AUX.RELAY / MCR | AUX.RELAY / MCR |
|---|---|---|---|
| ADDR-LABEL-USED | ADDR-LABEL-USED | ADDR-LABEL-USED | ADDR-LABEL-USED |
| M100-ETCON- 3 | M110- - | M120- - | M130- - |
| M101- - | M111- - | M121- - | M131- - |
| M102- - | M112- - | M122- - | M132- - |
| M103- - | M113- - | M123- - | M133- - |
| M104- - | M114- - | M124- - | M134- - |
| M105- - | M115- - | M125- - | M135- - |
| M106- - | M116- - | M126- - | M136- - |
| M107- - | M117- - | M127- - | M137- - |

INPUT/OUTPUT REFERENCE LIST Page 4

| AUX.RELAY / MCR | AUX.RELAY / MCR | AUX.RELAY / MCR | AUX.RELAY / MCR |
|---|---|---|---|
| ADDR-LABEL-USED | ADDR-LABEL-USED | ADDR-LABEL-USED | ADDR-LABEL-USED |
| M140- - | M150- - | M160- - | M170- - |
| M141- - | M151- - | M161- - | M171- - |
| M142- - | M152- - | M162- - | M172- - |
| M143- - | M153- - | M163- - | M173- - |
| M144- - | M154- - | M164- - | M174- - |
| M145- - | M155- - | M165- - | M175- - |
| M146- - | M156- - | M166- - | M176- - |
| M147- - | M157- - | M167- - | M177- - |

INPUT/OUTPUT REFERENCE LIST Page 5

| AUX. RELAYS | AUX. RELAYS | AUX. RELAYS | AUX. RELAYS |
|---|---|---|---|
| ADDR-LABEL-USED | ADDR-LABEL-USED | ADDR-LABEL-USED | ADDR-LABEL-USED |
| M200- - | M210- - | M220- - | M230- - |
| M201- - | M211- - | M221- - | M231- - |
| M202- - | M212- - | M222- - | M232- - |
| M203- - | M213- - | M223- - | M233- - |
| M204- - | M214- - | M224- - | M234- - |
| M205- - | M215- - | M225- - | M235- - |
| M206- - | M216- - | M226- - | M236- - |
| M207- - | M217- - | M227- - | M237- - |

INPUT/OUTPUT REFERENCE LIST Page 6

| AUX. RELAYS | AUX. RELAYS | AUX. RELAYS | AUX. RELAYS |
|---|---|---|---|
| ADDR-LABEL-USED | ADDR-LABEL-USED | ADDR-LABEL-USED | ADDR-LABEL-USED |
| M240- - | M250- - | M260- - | M270- - |
| M241- - | M251- - | M261- - | M271- - |
| M242- - | M252- - | M262- - | M272- - |
| M243- - | M253- - | M263- - | M273- - |
| M244- - | M254- - | M264- - | M274- - |
| M245- - | M255- - | M265- - | M275- - |
| M246- - | M256- - | M266- - | M276- - |
| M247- - | M257- - | M267- - | M277- - |

INPUT/OUTPUT REFERENCE LIST Page 7

| BAT.BCKUP.AUX | BAT.BCKUP.AUX | BAT.BCKUP.AUX | BAT.BCKUP.AUX |
|---|---|---|---|
| ADDR-LABEL-USED | ADDR-LABEL-USED | ADDR-LABEL-USED | ADDR-LABEL-USED |
| M300- - | M310- - | M320- - | M330- - |
| M301- - | M311- - | M321- - | M331- - |
| M302- - | M312- - | M322- - | M332- - |
| M303- - | M313- - | M323- - | M333- - |
| M304- - | M314- - | M324- - | M334- - |
| M305- - | M315- - | M325- - | M335- - |
| M306- - | M316- - | M326- - | M336- - |
| M307- - | M317- - | M327- - | M337- - |

INPUT/OUTPUT REFERENCE LIST Page 8

| BAT.BCKUP.AUX | BAT.BCKUP.AUX | BAT.BCKUP.AUX | BAT.BCKUP.AUX |
|---|---|---|---|
| ADDR-LABEL-USED | ADDR-LABEL-USED | ADDR-LABEL-USED | ADDR-LABEL-USED |
| M340- - | M350- - | M360- - | M370- - |
| M341- - | M351- - | M361- - | M371- - |
| M342- - | M352- - | M362- - | M372- - |
| M343- - | M353- - | M363- - | M373- - |
| M344- - | M354- - | M364- - | M374- - |
| M345- - | M355- - | M365- - | M375- - |
| M346- - | M356- - | M366- - | M376- - |
| M347- - | M357- - | M367- - | M377- - |

INPUT/OUTPUT REFERENCE LIST Page 9

| INPUTS | INPUTS | INPUTS | OUTPUTS |
|---|---|---|---|
| ADDR-LABEL-USED | ADDR-LABEL-USED | ADDR-LABEL-USED | ADDR-LABEL-USED |
| X400-B4APB- 1 | X410- HOL - 3 | X420- - | Y430- T1A - 2 |
| X401- BOL - 3 | X411-ECINT- 2 | X421- - | Y431- T2A - 2 |
| X402-HUPB - 5 | X412-HULS - 2 | X422- - | Y432- T3A - 2 |
| X403-HDPB - 4 | X413-HLLS - 2 | X423- - | Y433- T4A - 1 |
| X404-H1APB- 2 | X414- - | X424- - | Y434- HU - 5 |
| X405-H2APB- 2 | X415- - | X425- - | Y435- HD - 5 |
| X406-H3APB- 2 | X416- - | X426- - | Y436- H1A - 2 |
| X407-H4APB- 2 | X417- - | X427- - | Y437- H2A - 2 |

INPUT/OUTPUT REFERENCE LIST Page 10

| OUTPUTS | TIMERS | COUNTERS | SPECIAL RELAYS |
|---|---|---|---|
| ADDR-LABEL-USED | ADDR-LABEL-USED | ADDR-LABEL-USED | ADDR-LABEL-USED |
| Y440- - | T450-H3AT - 2 | C460-TWCTR- 1 | M470- - |
| Y441- - | T451-ECFOT- 2 | C461-TWCTR- 1 | M471- - |
| Y442- - | T452- - | C462-HOCTR- 1 | M472- - |
| Y443- - | T453- - | C463-HUCTR- 1 | M473- - |
| Y444- - | T454- - | C464-HUCTR- 1 | M474-UP/DN- 1 |
| Y445- - | T455- - | C465-HDCTR- 1 | M475-UPMOD- 1 |
| Y446- - | T456- - | C466-HDCTR- 1 | M476-SU/SD- 6 |
| Y447- - | T457- - | C467-ULCTR- 1 | M477- - |

INPUT/OUTPUT REFERENCE LIST Page 11

| INPUTS | INPUTS | INPUTS | OUTPUTS |
|---|---|---|---|
| ADDR-LABEL-USED | ADDR-LABEL-USED | ADDR-LABEL-USED | ADDR-LABEL-USED |
| X500- - | X510- - | X520- - | Y530- H3A - 2 |
| X501- - | X511- - | X521- - | Y531- H4A - 2 |
| X502- - | X512- - | X522- - | Y532-EC1st- 4 |
| X503- - | X513- - | X523- - | Y533-ECFON- 1 |
| X504- - | X514- - | X524- - | Y534-ECOFF- 1 |
| X505- - | X515- - | X525- - | Y535-EC4th- 1 |
| X506- - | X516- - | X526- - | Y536-EC3rd- 1 |
| X507- - | X517- - | X527- - | Y537-EC2nd- 1 |

INPUT/OUTPUT REFERENCE LIST Page 12

| OUTPUTS | TIMERS | COUNTERS | SPECIAL RELAYS |
|---|---|---|---|
| ADDR-LABEL-USED | ADDR-LABEL-USED | ADDR-LABEL-USED | ADDR-LABEL-USED |
| Y540- - | T550- - | C560-LLCTR- 1 | M570- - |
| Y541- - | T551- - | C561- - | M571- - |
| Y542- - | T552- - | C562- - | M572- - |
| Y543- - | T553- - | C563- - | M573- - |
| Y544- - | T554- - | C564- - | M574- - |
| Y545- - | T555- - | C565- - | M575- - |
| Y546- - | T556- - | C566- - | M576- - |
| Y547- - | T557- - | C567- - | M577- - |

INPUT/OUTPUT REFERENCE LIST Page 13

| STEP LADDER | STEP LADDER | STEP LADDER | STEP LADDER |
|---|---|---|---|
| ADDR-LABEL-USED | ADDR-LABEL-USED | ADDR-LABEL-USED | ADDR-LABEL-USED |
| S600- - | S610- - | S620- - | S630- - |
| S601- - | S611- - | S621- - | S631- - |
| S602- - | S612- - | S622- - | S632- - |
| S603- - | S613- - | S623- - | S633- - |
| S604- - | S614- - | S624- - | S634- - |
| S605- - | S615- - | S625- - | S635- - |
| S606- - | S616- - | S626- - | S636- - |
| S607- - | S617- - | S627- - | S637- - |

INPUT/OUTPUT REFERENCE LIST Page 14

| STEP LADDER | TIMERS | COUNTERS | FUNCTION COILS |
|---|---|---|---|
| ADDR-LABEL-USED | ADDR-LABEL-USED | ADDR-LABEL-USED | ADDR-LABEL-USED |
| S640- - | T650- - | C660- - | F670- - |
| S641- - | T651- - | C661- - | F671- - |
| S642- - | T652- - | C662- - | F672- - |
| S643- - | T653- - | C663- - | F673- - |
| S644- - | T654- - | C664- - | F674- - |
| S645- - | T655- - | C665- - | F675- - |
| S646- - | T656- - | C666- - | F676- - |
| S647- - | T657- - | C667- - | F677- - |

INPUT/OUTPUT REFERENCE LIST Page 15

| JUMPS | JUMPS | JUMPS | JUMPS |
|---|---|---|---|
| ADDR-LABEL-USED | ADDR-LABEL-USED | ADDR-LABEL-USED | ADDR-LABEL-USED |
| J700- - | J710- - | J720- - | J730- - |
| J701- - | J711- - | J721- - | J731- - |
| J702- - | J712- - | J722- - | J732- - |
| J703- - | J713- - | J723- - | J733- - |
| J704- - | J714- - | J724- - | J734- - |
| J705- - | J715- - | J725- - | J735- - |
| J706- - | J716- - | J726- - | J736- - |
| J707- - | J717- - | J727- - | J737- - |

INPUT/OUTPUT REFERENCE LIST Page 16

| JUMPS | JUMPS | JUMPS | JUMPS |
|---|---|---|---|
| ADDR-LABEL-USED | ADDR-LABEL-USED | ADDR-LABEL-USED | ADDR-LABEL-USED |
| J740- - | J750- - | J760- - | J770- - |
| J741- - | J751- - | J761- - | J771- - |
| J742- - | J752- - | J762- - | J772- - |
| J743- - | J753- - | J763- - | J773- - |
| J744- - | J754- - | J764- - | J774- - |
| J745- - | J755- - | J765- - | J775- - |
| J746- - | J756- - | J766- - | J776- - |
| J747- - | J757- - | J767- - | J777- - |

INPUT/OUTPUT REFERENCE LIST Page 17

| STEP LADDER | STEP LADDER | STEP LADDER | STEP LADDER |
|---|---|---|---|
| ADDR-LABEL-USED | ADDR-LABEL-USED | ADDR-LABEL-USED | ADDR-LABEL-USED |
| S800- - | S810- - | S820- - | S830- - |
| S801- - | S811- - | S821- - | S831- - |
| S802- - | S812- - | S822- - | S832- - |
| S803- - | S813- - | S823- - | S833- - |
| S804- - | S814- - | S824- - | S834- - |
| S805- - | S815- - | S825- - | S835- - |
| S806- - | S816- - | S826- - | S836- - |
| S807- - | S817- - | S827- - | S837- - |

INPUT/OUTPUT REFERENCE LIST Page 18

| STEP LADDER | STEP LADDER | STEP LADDER | STEP LADDER |
|---|---|---|---|
| ADDR-LABEL-USED | ADDR-LABEL-USED | ADDR-LABEL-USED | ADDR-LABEL-USED |
| S840- - | S850- - | S860- - | S870- - |
| S841- - | S851- - | S861- - | S871- - |
| S842- - | S852- - | S862- - | S872- - |
| S843- - | S853- - | S863- - | S873- - |
| S844- - | S854- - | S864- - | S874- - |
| S845- - | S855- - | S865- - | S875- - |
| S846- - | S856- - | S866- - | S876- - |
| S847- - | S857- - | S867- - | S877- - |

INPUT/OUTPUT REFERENCE LIST Page 19

| STEP LADDER | STEP LADDER | STEP LADDER | STEP LADDER |
|---|---|---|---|
| ADDR-LABEL-USED | ADDR-LABEL-USED | ADDR-LABEL-USED | ADDR-LABEL-USED |
| S900- - | S910- - | S920- - | S930- - |
| S901- - | S911- - | S921- - | S931- - |
| S902- - | S912- - | S922- - | S932- - |
| S903- - | S913- - | S923- - | S933- - |
| S904- - | S914- - | S924- - | S934- - |
| S905- - | S915- - | S925- - | S935- - |
| S906- - | S916- - | S926- - | S936- - |
| S907- - | S917- - | S927- - | S937- - |

INPUT/OUTPUT REFERENCE LIST Page 20

| STEP LADDER | STEP LADDER | STEP LADDER | STEP LADDER |
|---|---|---|---|
| ADDR-LABEL-USED | ADDR-LABEL-USED | ADDR-LABEL-USED | ADDR-LABEL-USED |
| S940- - | S950- - | S960- - | S970- - |
| S941- - | S951- - | S961- - | S971- - |
| S942- - | S952- - | S962- - | S972- - |
| S943- - | S953- - | S963- - | S973- - |
| S944- - | S954- - | S964- - | S974- - |
| S945- - | S955- - | S965- - | S975- - |
| S946- - | S956- - | S966- - | S976- - |
| S947- - | S957- - | S967- - | S977- - |

Furnas Micro PC96 Model:K60 I/O Cross Reference Listing

Title - Compu-Logic crane control program

```
X0      TEPB
        -] [- Step 31,150,155

X1      TWPB
        -] [- Step 35,159,164

X2      T1APB
        -] [- Step 39

X3      T2APB
        -] [- Step 47

X4      T3APB
        -] [- Step 53

X5      T4APB
        -] [- Step 59

X6      TOL
        -] [- Step 32,36
        -]/[- Step 147

X7      BNPB
        -] [- Step 0,128,133

X10     BSPB
        -] [- Step 4,137,142

X11     B1APB
        -] [- Step 8

X12     B2APB
        -] [- Step 16

X13     B3APB
        -] [- Step 22

Y30     BN
        -] [- Step 9,129,134
        -]/[- Step 6
        -( )- Step 3

Y31     BS
        -] [- Step 10,138,143
        -]/[- Step 2
        -( )- Step 7

Y32     B1A
        -] [- Step 17
        -( )- Step 12

Y33     B2A
        -] [- Step 23
        -( )- Step 18

Y34     B3A
        -] [- Step 29
        -( )- Step 24

Y35     B4A
        -( )- Step 30
```

```
Y36     TE
        -] [- Step 40,151,156
        -]/[- Step 37
        -( )- Step 34

Y37     TW
        -] [- Step 41,160,165
        -]/[- Step 33
        -( )- Step 38

T50     B1AT
        -] [- Step 15
        (TMR) Step 13

T51     B2AT
        -] [- Step 21
        (TMR) Step 19

T52     B3AT
        -] [- Step 27
        (TMR) Step 25

T53     T1AT
        -] [- Step 46
        (TMR) Step 44

T54     T2AT
        -] [- Step 52
        (TMR) Step 50

T55     T3AT
        -] [- Step 58
        (TMR) Step 56

T56     H1AT
        -] [- Step 82
        (TMR) Step 80

T57     H2AT
        -] [- Step 88
        (TMR) Step 86

C60     BOCTR
        (CTR) Step 126

C61     BNCTR
        (CTR) Step 130

C62     BNCTR
        (CTR) Step 135

C63     BSCTR
        (CTR) Step 139

C64     BSCTR
        (CTR) Step 144

C65     TOCTR
        (CTR) Step 148

C66     TECTR
        (CTR) Step 152

C67     TECTR
        (CTR) Step 157

M70     PCRUN
        -] [- Step 120,122

M71     SCAN1
        -]/[- Step 124,146,168,190,194

M100    ETCON
        -] [- Step 111,117
        -( )- Step 113
```

```
X400    B4APB
        -] [- Step 28

X401     BOL
        -] [- Step 1,5
        -]/[- Step 125

X402    HUPB
        -] [- Step 62,65,77,172,177

X403    HDPB
        -] [- Step 63,71,181,186

X404    H1APB
        -] [- Step 83,108

X405    H2APB
        -] [- Step 89,106

X406    H3APB
        -] [- Step 100,104

X407    H4APB
        -] [- Step 78,95

X410     HOL
        -] [- Step 66,72
        -]/[- Step 169

X411    ECINT
        -] [- Step 67,73

X412    HULS
        -] [- Step 68
        -]/[- Step 191

X413    HLLS
        -] [- Step 74
        -]/[- Step 195

Y430     T1A
        -] [- Step 48
        -( )- Step 43

Y431     T2A
        -] [- Step 54
        -( )- Step 49

Y432     T3A
        -] [- Step 60
        -( )- Step 55

Y433     T4A
        -( )- Step 61

Y434     HU
        -] [- Step 101,173,178
        -]/[- Step 75
        -( )- Step 70

Y435    HD
        -] [- Step 99,182,187
        -]/[- Step 69
        -( )- Step 76

Y436    H1A
        -] [- Step 84
        -( )- Step 79
```

```
Y437    H2A
        -] [- Step 90
        -( )- Step 85

T450    H3AT
        -] [- Step 94
        (TMR) Step 92

T451    ECFOT
        -]/[- Step 112
        (TMR) Step 115

C460    TWCTR
        (CTR) Step 161

C461    TWCTR
        (CTR) Step 166

C462    HOCTR
        (CTR) Step 170

C463    HUCTR
        (CTR) Step 174

C464    HUCTR
        (CTR) Step 179

C465    HDCTR
        (CTR) Step 183

C466    HDCTR
        (CTR) Step 188

C467    ULCTR
        (CTR) Step 192

M474    UP/DN
        -( )- Step 121

M475    UPMOD
        -( )- Step 123

M476    SU/SD
        -] [- Step 132,141,154,163,176,185

Y530    H3A
        -] [- Step 96
        -( )- Step 91

Y531    H4A
        -] [- Step 98
        -( )- Step 97

Y532    EC1st
        -] [- Step 110
        -]/[- Step 114,118
        -( )- Step 64

Y533    ECFON
        -( )- Step 119

Y534    ECOFF
        -( )- Step 103

Y535    EC4th
        -( )- Step 105

Y536    EC3rd
        -( )- Step 107

Y537    EC2nd
        -( )- Step 109

C560    LLCTR
        (CTR) Step 196
```

The signals M70–M77 and M476 are memory or counter signals which allow counting and storage of activity from 1000 to 999,999.

After use of the system over a period of time, an operator or the person in charge of maintenance of the crane may employ a Programmable Controller 100 to determine the amount of use, number of activities and number of overloads over a period of time since start-up or the last resetting of the counters to "zero." Since the counters cannot be reset without a programmable unit which would normally be used only by maintenance workers and not by operating workers, this arrangement limits the possibility of operating personnel changing the record of use or working "field modifications" to the operation equipment.

THE COMPUTER FLOW DIAGRAMS

The overall operation of the computer program and of the system can be appreciated from FIGS. 11 through 26. (In FIG. 11, "forward" is equivalent to "north" and "reverse" is equivalent to "south." In FIG. 16, "forward" is "east" and "reverse" is "west.") Basically, the computer continuously asks the status of the inputs and, based on the "answers" received and the stored information, responds as shown in FIGS. 11 through 26.

Figure 11:
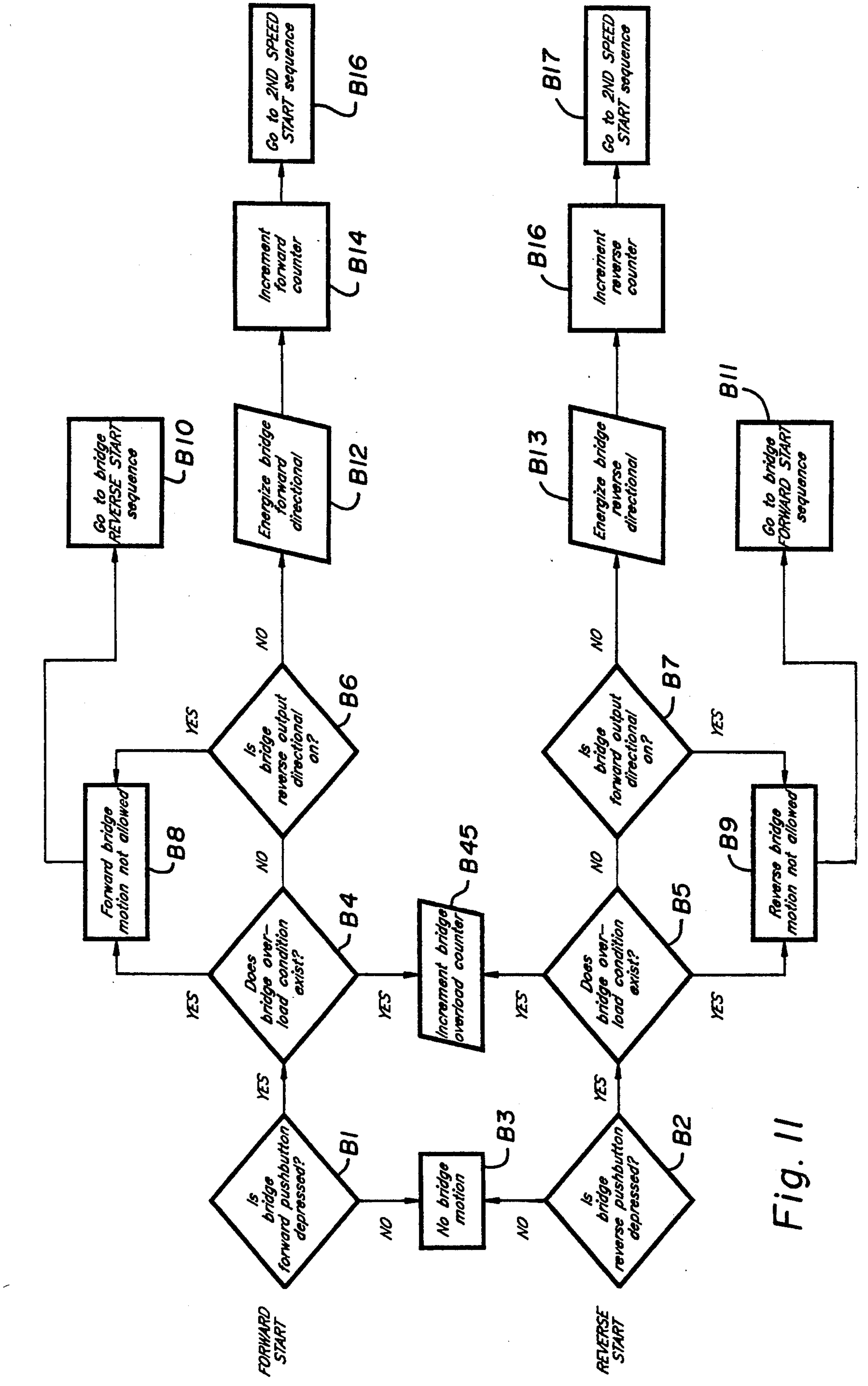
FIGS. 11 to 26 are computer flow charts of the computer programs, including subroutines, for the control systems for the system of FIGS. 1–10.

For example, referring to FIG. 11, the computer inquires at steps B1 and B2 whether or not the push button for bridge north (forward) or south (reverse) has been pushed. In other words, as to whether or not contacts BN or BS of FIG. 7 are closed. If neither are closed and the answer to steps B1 and B2 is "no," then, as indicated at step B3, no bridge motion is undertaken. However, if the answer to either B1 or B2 is "yes," the computer first inquires in steps B4 and B5 as to whether an overload situation exists. If "no," the computer in steps B6 and B7 asks if the opposite command is "on." That is, at Step 6, is the output of B2 "yes"? If so, then step B6 does not permit action, as indicated by Box B8, and starts the reverse start sequence (step B2) as indicated by box B10. A similar sequence of steps, B9, B11, is taken if the output of B7 is "yes." A "yes" output from either of steps B4 or B5 operates the overload counter, Box B45, and the steps B8, B10 or B9, B11.

If the output of either step B6 or B7 is "no," then the bridge is enabled to move (Box B12 or B13), the increment counter is caused to count an additional north (or south) activation (Box B14 or B16), and the second speed start sequence is initiated (Box B16 or B17).

Figure 12:
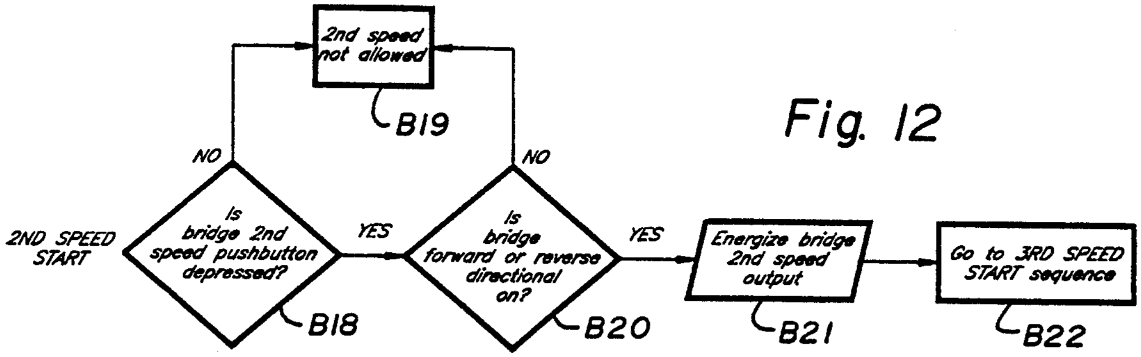

As indicated in FIG. 12, the second speed start sequence includes a first step B18 which inquires of the system whether the second speed push button switch is closed (i.e., whether contacts B1A are closed). If "no," then, as indicated by Box B19, change of the system to the second speed is not allowed. However, if "yes," the computer then inquires in step B20 if either BN or BS (FIG. 7) is closed and, if not, no further action is taken (Box B19). If the output for step B20 is "yes," the second speed is energized (Box B21) and then the third speed start sequence is energized (Box B22).

Figure 13:
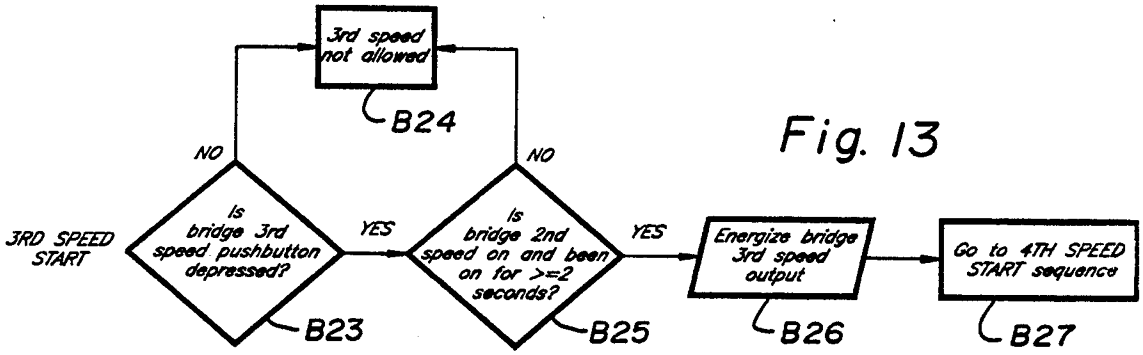
Figure 14:
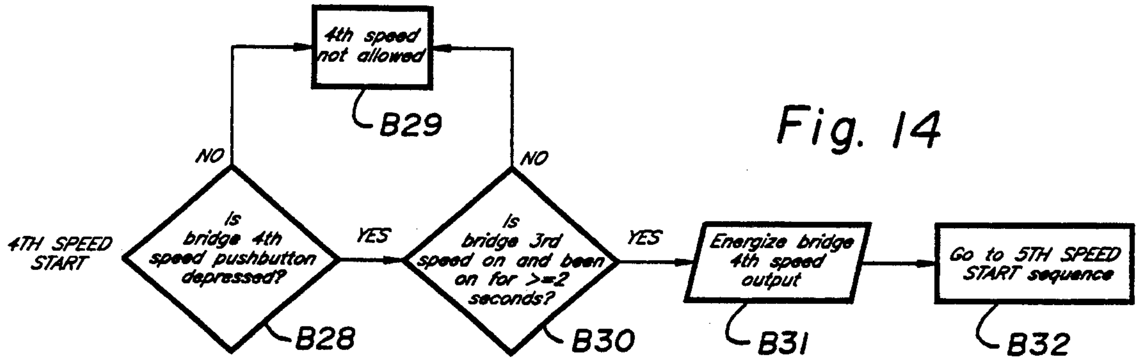

Referring to FIG. 13, the speed start subroutine is there illustrated. This sequence includes steps B23–B27, which are generally similar to those of the second start sequence of FIG. 12 except with regard to third speed instead of second speed and, more importantly, in step B24 for the requirement that the second speed must have been activated for two seconds or more before steps B26 and B27 may occur. If so, step B27 starts the subroutine of FIG. 14, steps B28–B32, which is similar to that of FIG. 13. If and when the output from step B30 is "yes," the subroutine of FIG. 15 may be executed.

Figure 15:
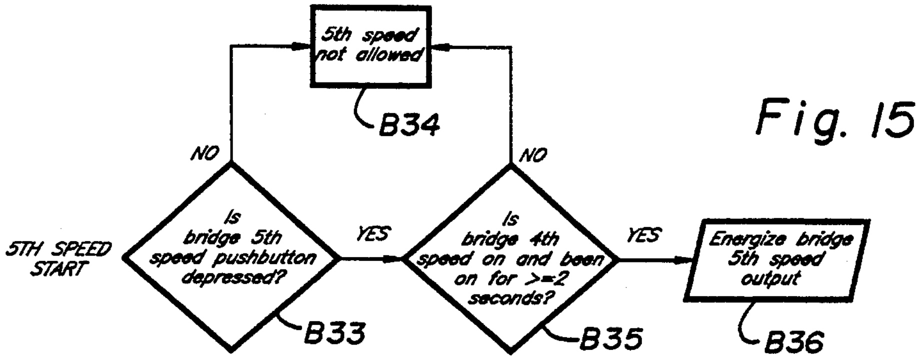
Figure 16:
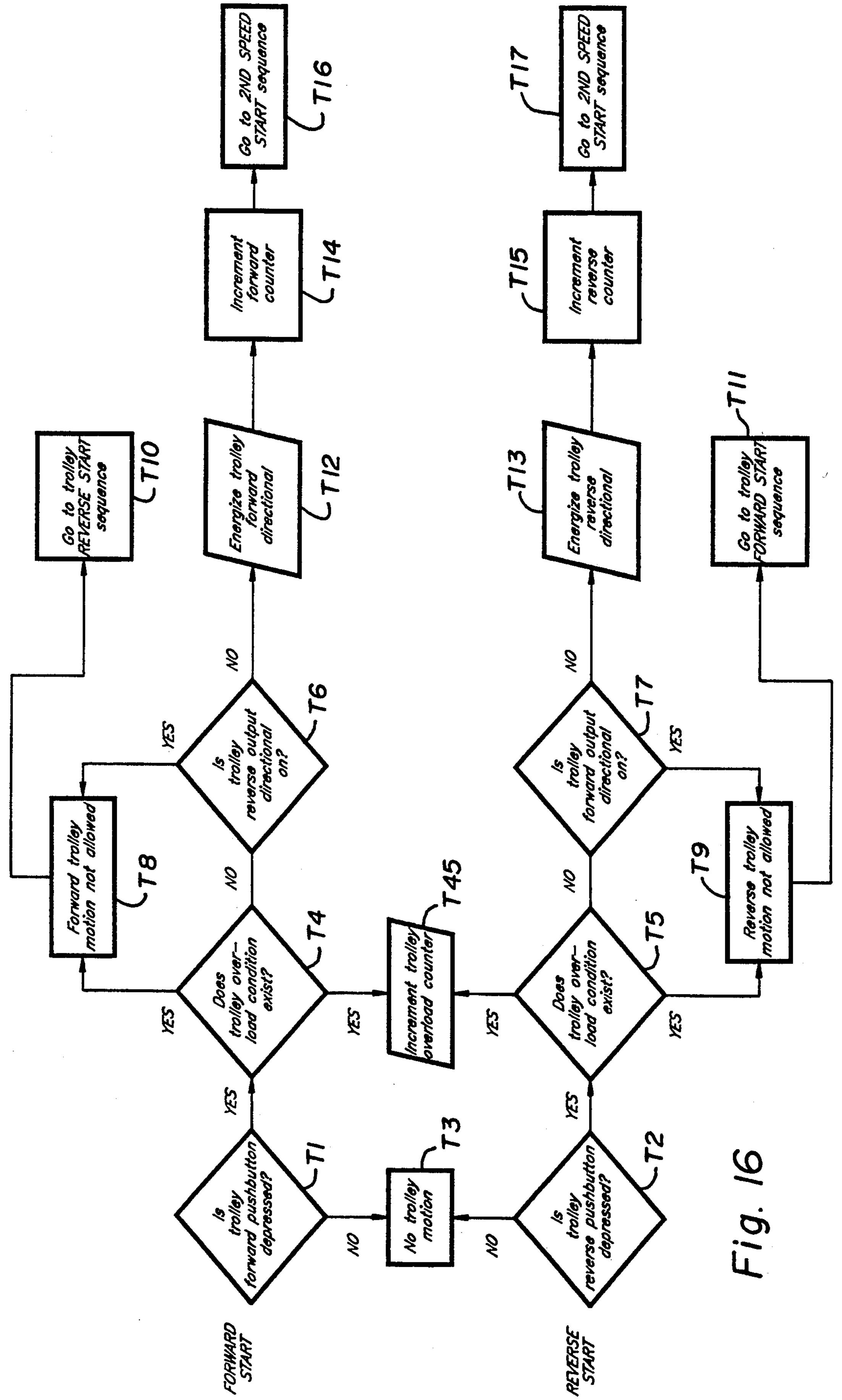
Figure 17:
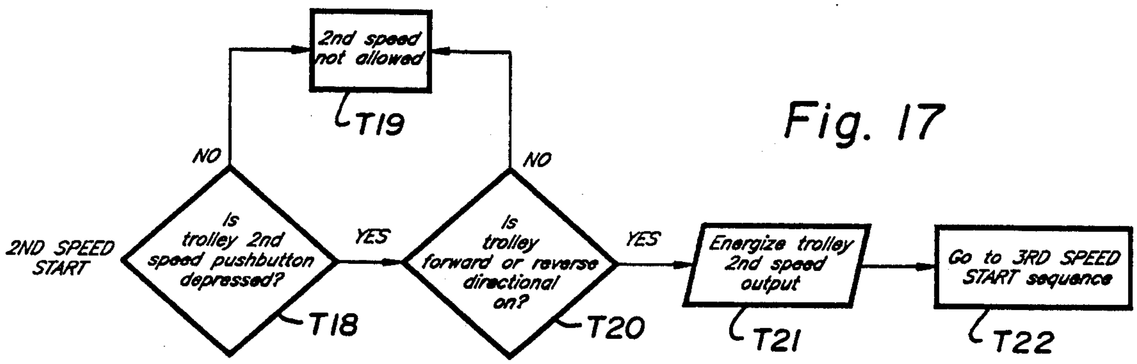
Figure 18:
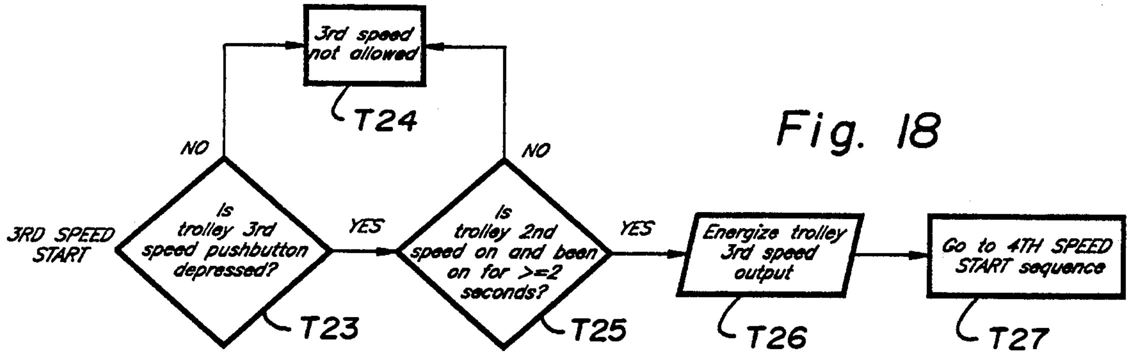
Figure 19:
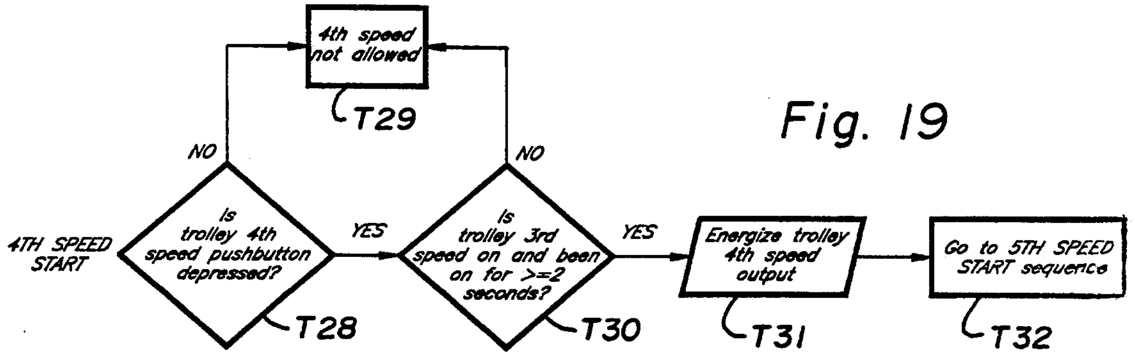
Figure 20:
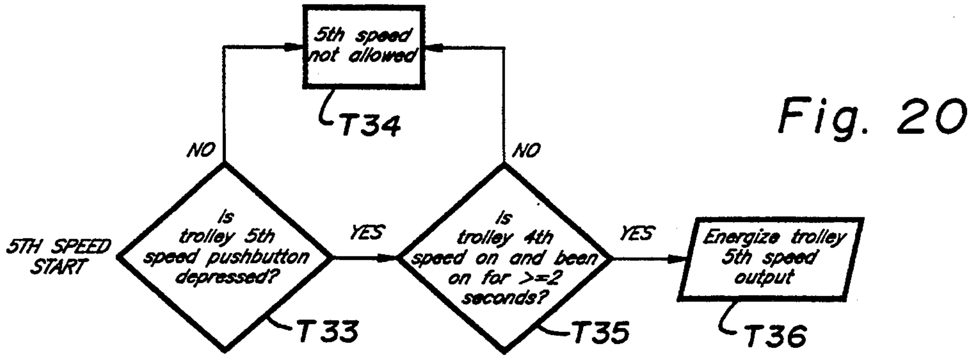

Referring to FIG. 15, the first step B33 of the fifth speed subroutine is the inquiry as to whether or not the control unit (pendant 30) has its fifth speed contact (B4A - FIG. 7) closed. If not, no action is taken, B34; if "yes," then a further inquiry B35 is made as to whether or not the bridge has had its fourth speed on for two seconds or more. If "no," no action is taken, B34; if "yes," the fifth speed output is energized (Box 36).

FIGS. 16–20 depict the steps of the computer control of the trolley and contain steps T1–T36 essentially similar to that of the bridge control, FIGS. 11–15, except for relating to the trolley instead of the bridge. As such, in the interest of brevity, a discussion of these steps will be omitted, it being understood that they are essentially the same as the above-depicted steps.

Figure 21:
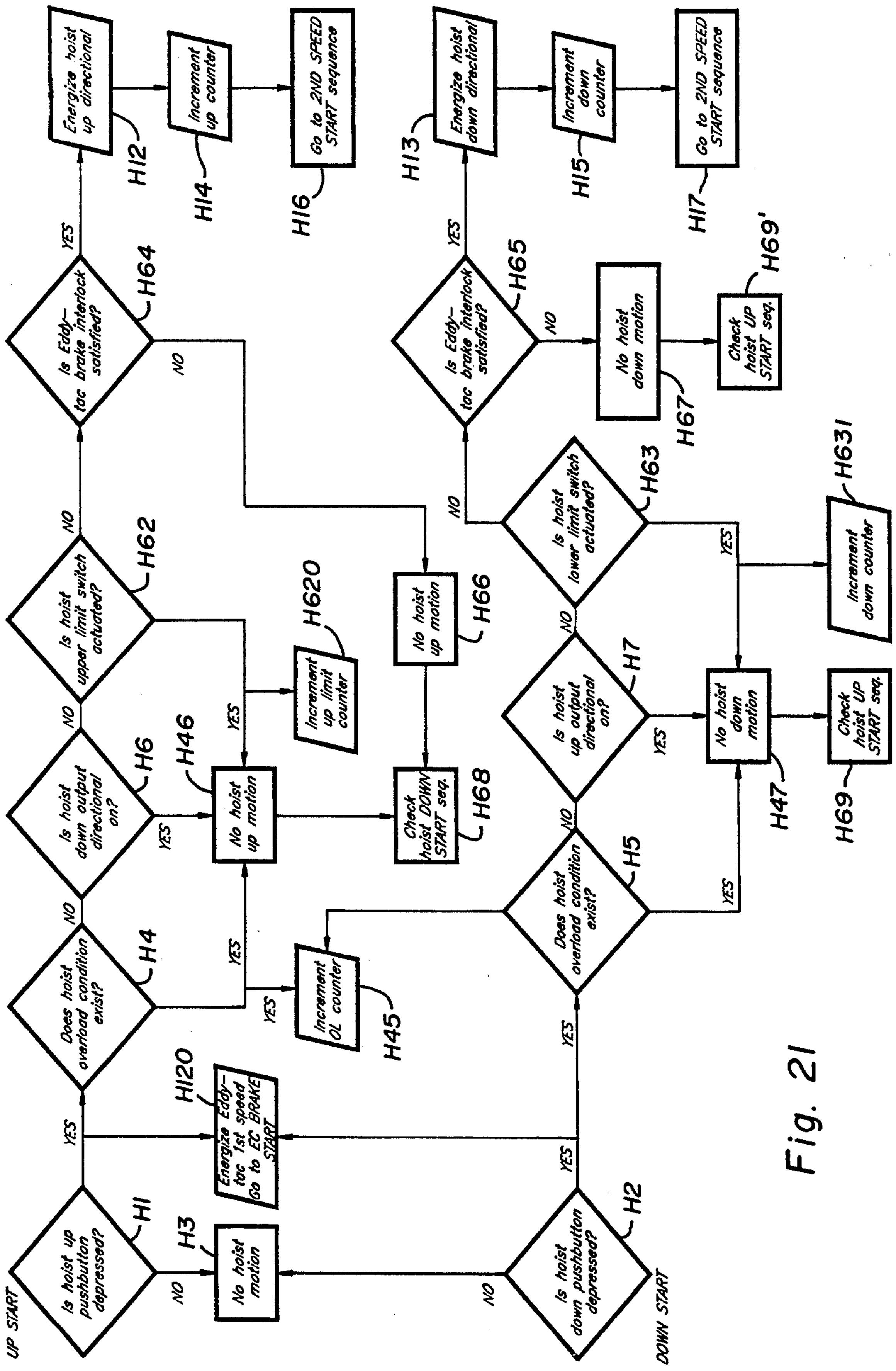

As can be seen from FIG. 21, the steps involved in the hoist's control are more complex. The computer begins by surveying the up and down push-button inputs in steps H1 and H2; if the answer to this inquiry is "no" in both cases, no action is undertaken (Box H3). If "yes" in either case, an overload inquiry is made, steps H4 or H5, but if either response is "yes," the Eddy-tac brake is set for its first speed, step H120. This starts the subroutine of FIG. 26. If the answer to the inquiry is "yes" at step H4, a signal is sent to the increment overload counter, as indicated at Box H45, and no hoist motion results, as indicated at Box H46. If there is no overload at step H4, the program proceeds to step H6, which queries the system as to whether or not the hoist "down" directional switch is "on" or closed. This is a safety interlock step similar to steps T6 and B6. If somehow the answer is "yes," no hoist motion is undertaken (Box H46) and also a signal is sent to the increment up limit counter to add "1" to the number of counted limit up occurrences (Box H620); if "no," then step H62 is initiated, which inquires whether or not the upper limit switch ULS (FIG. 8) of the hoist is opened. This conventional switch is incorporated in the hoist unit 18 (FIG. 1) and is normally closed except when the hoist mechanism has reached its uppermost position. One does not, of course, wish to attempt to drive upward a hoist which is physically at its uppermost position. If the answer at step H61 is "yes," no action is taken (Box H46); if the answer is "no," a further step H62 is performed. This step inquires as to whether the Eddy-tac brake interlock (FIG. 8) is satisfied; if not, then, as indicated by Box H66, no up motion is undertaken. If either step of Box H46 or Box H47 is activated, step H68 has the program go to the down start sequences H2, to determine if the hoist push button is pressed.

Figure 22:
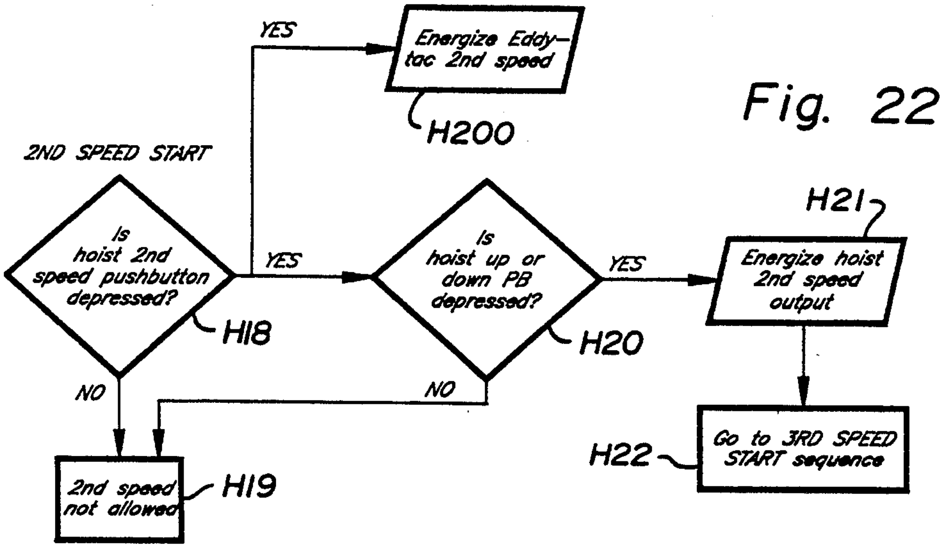

Only if the correct answers are offered at steps H1, H4, H6, H62, and H64 is the output to energize the hoist up H12, drive the increment up counter to add one more "up" count H14, and initiate the second speed start sequence H16 at FIG. 22.

The sequence for down operation is similar, involving steps H2, H5, H7, H63, H65, H15 and H17 to go to the second speed start sequence of FIG. 22. Secondary steps H47, H67, H69, and H69 and H631 are analogous to steps H46, H66, H68, and H630, respectively, of the above-described portion of the flow chart.

FIG. 22 depicts the sequence of logic steps for energizing the second hoist speed of the hoist motion and for going to the third speed start subroutine. The initial inquiry H18 is whether or not the operator is calling for a second speed by closing contact H1A of the control 30 (FIG. 8). If "no," then no action is taken, Box H19. If "yes," then the Eddy-tac second speed brake is actuated H200 and the next logic step H20 is undertaken. Step H20 inquires of the system as to whether or not either of the hoist up or down push buttons are depressed; if "yes" the second motor speed output is initiated, H21, and the third speed subroutine started, H22. If "no," the second speed is not allowed, H19.

Figure 23:
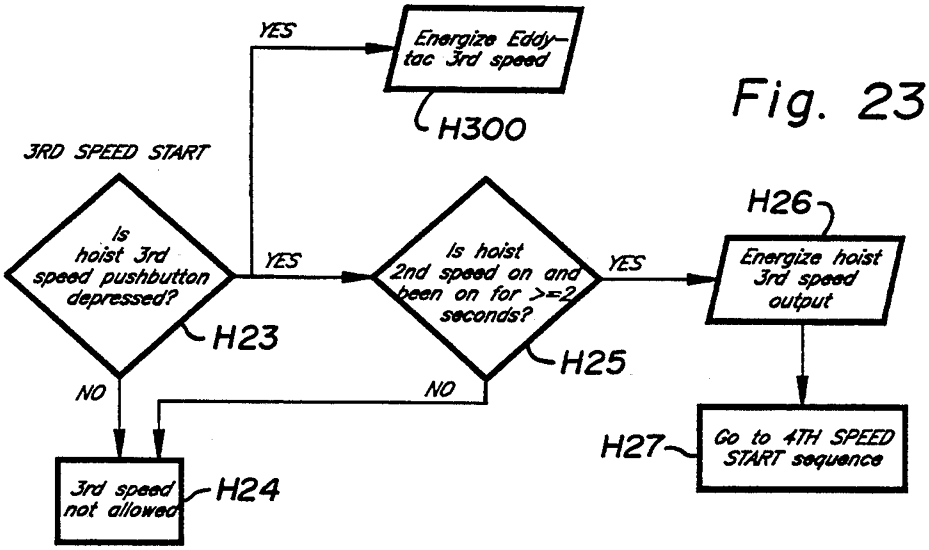

FIG. 23 depicts the third speed subroutine. The initial step H23 is to determine if the third speed command is present; if "no," no further action is allowed, H24. If "yes," the Eddy-tac third speed is authorized H300 and step H25 is undertaken. In step H25, the system is queried as to whether or not the second speed is still on and has been on for two seconds or more. If "no," no action is taken H24 until this condition occurs. When and if it does, the "yes" output from step H25 is to energize the third speed H26 and go to the fourth speed start sequence H27.

Figure 24:
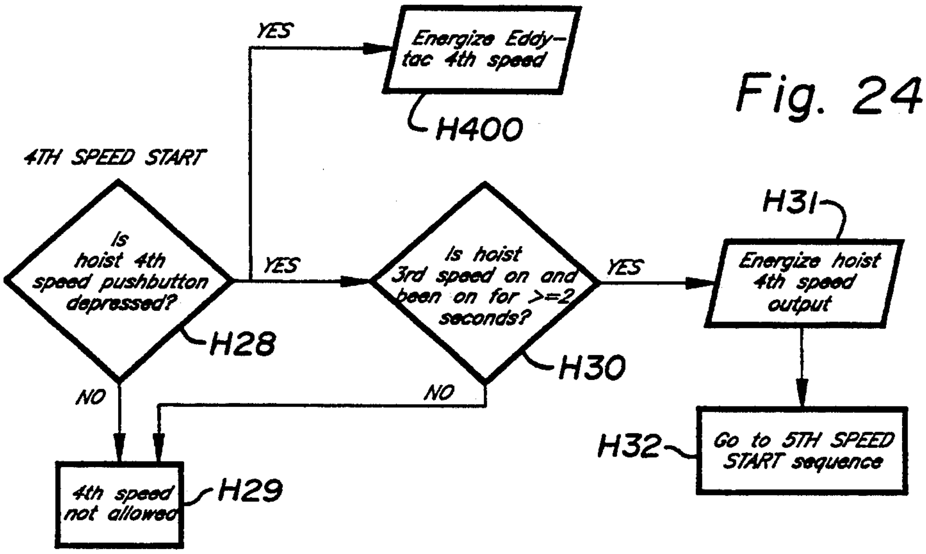

The fourth speed start subroutine is shown in FIG. 24, wherein steps H28, H29, H30, H400, H31 and H32 correspond to those of H23, H24, H25, H300, H26 and H27 of FIG. 23 and therefore need not be further detailed. When the answers to steps H28 and H30 are both "yes," the third speed is authorized and the fourth speed start sequence of FIG. 25 is started.

Figure 25:
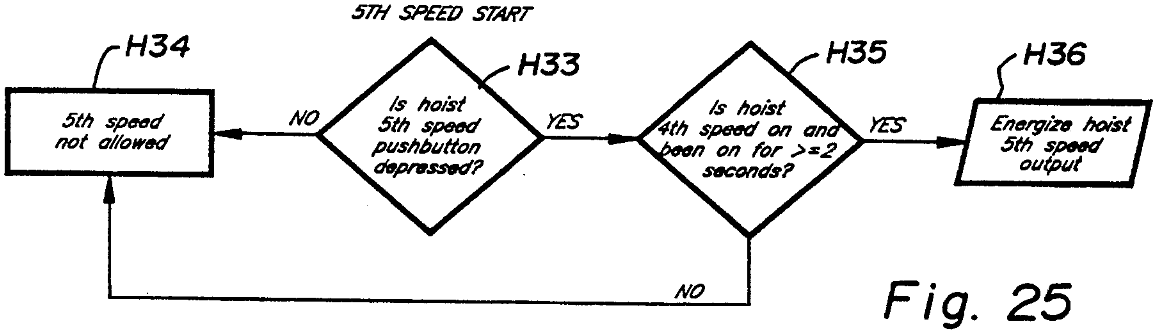

The fifth speed start subroutine of FIG. 25 in an initial step H33 inquires as to whether or not the hoist fifth push button (H4A - FIG. 8) is closed. If not, no further action is taken, H34. If so, then the step H35 is undertaken. That step queries the system as to whether or not the fourth speed is "on" and has been on for at least two seconds. If "no," no action is taken, H34; if and when this condition occurs, then the fifth speed is authorized, H36.

Figure 26:
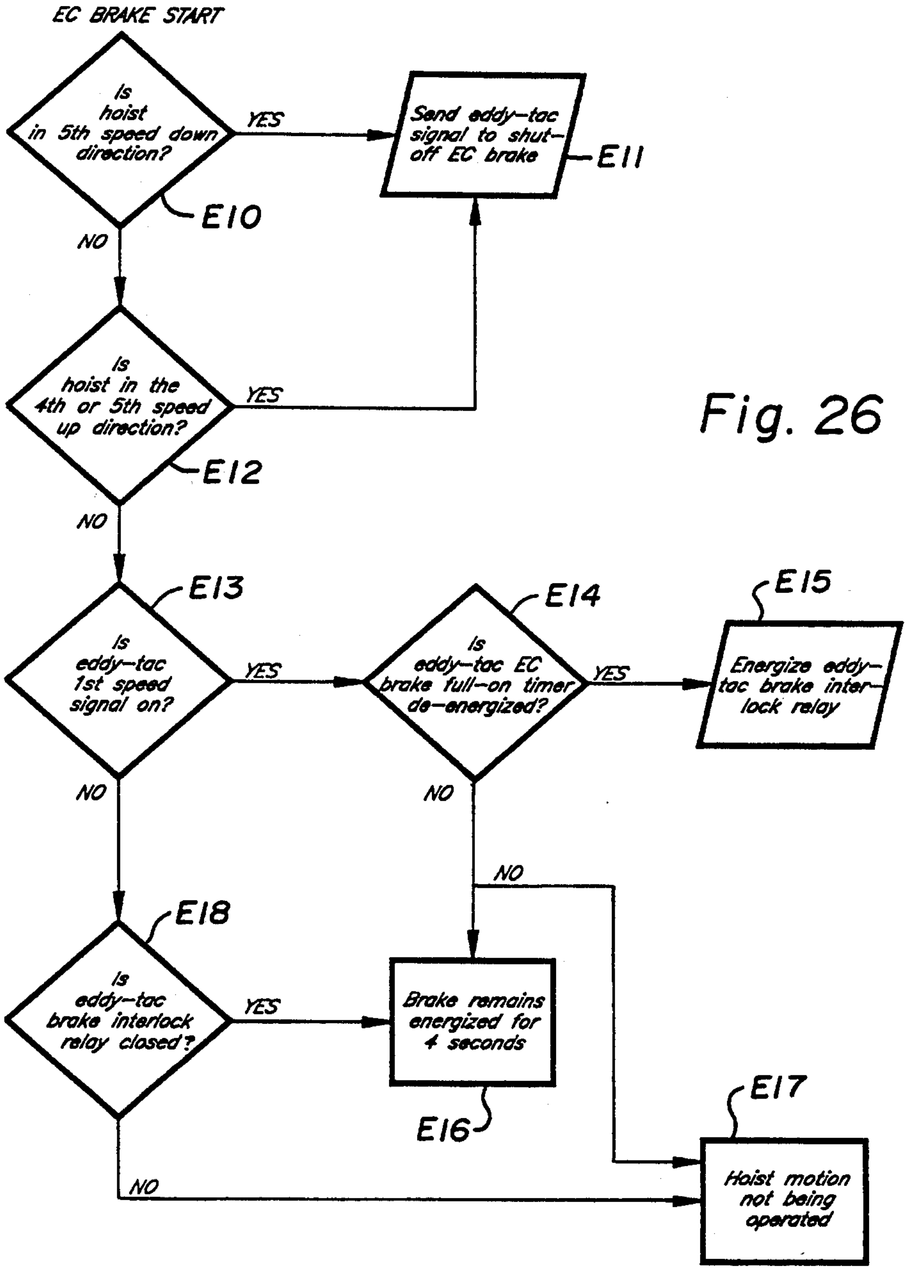

FIG. 26 shows the decision diagram for the automatically controlled Eddy-current brake. This subroutine is started by energization of the eddy-tac first speed, H120 of FIG. 21. The initial step E10 is to inquire as to whether or not the hoist is being driven at the fifth speed down. If "yes," the Eddy-tac signal is sent to shut off the Eddy-current brake, as indicated by E11. If "no," then a further inquiry is made at step E12. If the hoist is in the fifth or sixth speed up, the Eddy-current brake is also turned off. If not, a further inquiry of step E13 is made. If the Eddy-tac board speed feedback signals (from FIG. 10, inputs 7 and 8 of the board) that the first speed signal is "on," step E14 is undertaken. Step E14 inquires of the system whether or not the Eddy-current brake full-on timer has timed out. If it has, then, E15, the Eddy-tac brake interlock relay (contacts (9) and (10) of FIG. 8) is energized. If not, then the brake is allowed to remain energized for four seconds E16 and block E17. If the output of step E13 is "no," then step E18 is undertaken which inquires of the system whether or not the brake interlock relay is closed (that is, whether or not there is an input at 411 of FIG. 8. If "yes" the system goes to block E16, if "no" it goes to block E17. The general operation of the Eddy-tac board and Eddy-current brake are well known in this art and need not be detailed here.

Thus, it can be seen that in accord with the present invention, the system serves to sense and record instances of use and abuse of the crane and provides an output summarizing such use and abuse over a period of time. This is valuable information to the user in that it allows for more intelligent and economical scheduling of repair and replacement and also in that it alerts one of problems which may be solved before they become major problems and lead to accidents.

The advantages of this system should now be apparent. It provides for reduced parts, less chance of erroneous modification in the field, increased reliability since timer controls are eliminated, reduced risk of failure, and should result in less wear and less expensive maintenance.

While one particular embodiment of the invention has been shown and described, it will be obvious to those skilled in the art that changes and modifications may be made without departing from the invention and, therefore, the aim in the appended claims is to cover all such changes and modifications as fall within the true spirit and scope of the invention.

What is claimed as the invention is:

1. The method of operating an overhead crane of the type wherein operating units are driven in three different directions so as to position a hoist unit at any desired position within a volume of space for lifting, moving and depositing loads from one position to another within that volume, said overhead crane having three operating units including a bridge movable forwardly and reverse and a trolley movable forwardly and reverse on said bridge, a hoist mechanism mounted on said trolley for up and down movements, each of said three operating units being each independently driven by one of three separate electric motor means, each of which separate motor means is controlled by separate motor control means, said crane also including a source of command signals for operating the crane, said command signals include at least a bridge forward signal, a bridge reverse signal, a trolley forward and a trolley reverse signal, said crane also including a source of bridge overload signals and a source of trolley overload signals; a single computer of the programmable controller type coupled to each of said three electric motor control means to selectively energize or not energize the three separate electric motors means in response to a predetermined computer program and the command signals, said computer including means for receiving said command signals as inputs, and further including means with at least an incremental bridge overload counter and an incremental trolley overload counter, for storing information as to the number of overload operations of each of said separate electric motor means for said bridge and said trolley and for outputting said information on command, said computer program including at least the following subroutines:

(a) if said bridge forward signal is present, ask if a bridge overload signal in present, if "yes", increase the bridge overload counter and take no action toward further energizing said motor means associated with said bridge, if "no", query if said bridge reverse command signal is present and if the answer to this query in "yes", take no action toward further energizing said motor means associated with said bridge, if "no", energize said electric motor means associated with said bridge to drive said bridge forward;

(b) if said trolley forward signal is present ask if a trolley overload signal is present, if "yes", increase the trolley overload counter and take no action toward further energizing said motor means associated with said trolley, if "no", query if said trolley reverse command signal is present and if the answer to this query is "yes", take no action toward further energizing said motor means associated with said trolley, if "no", energize said electric motor means associated with said trolley to drive said trolley forward;

said means for storing and outputting information stores information generated from said subroutines relative to the use of said crane over a period of time and outputs such information on command; comprising the steps of:

(a) in response to a specific command to run a first of said three electric motor means in a selected direction, recording the selected direction of motion of said first motor means, sensing if the overload condition for that motor means is present and developing signals indicative of an overload situation in said first of said electric motor means;

(b) in response to a specific command to run a second of said three electric motor means in a selected direction, recording the selected direction of motion of said second motor means, sensing if the overload condition for that motor means is present and developing signals indicative of an overload situation in said electric motor means;

(c) recording said signals indicative of an overload situation in each of said first and second motor means as they occur over time in said programmable controller such that the number of overload situations over time as to each of the said first and said second electric motor means can be accumulated and determined by accessing said recorded information in said programmable controller;

(d) reading out the accumulated information so stored.

* * * * *